Aug. 31, 1943.  E. E. EICKMEYER ET AL  2,328,435
TICKET ISSUING FUEL DISPENSING APPARATUS
Filed Feb. 16, 1938  13 Sheets-Sheet 1
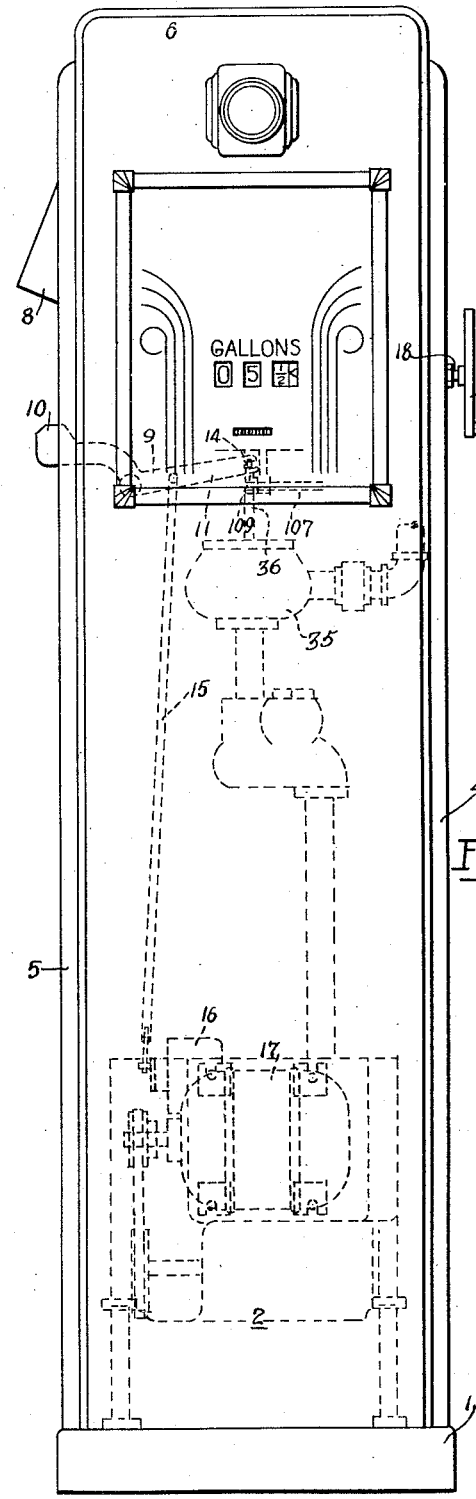
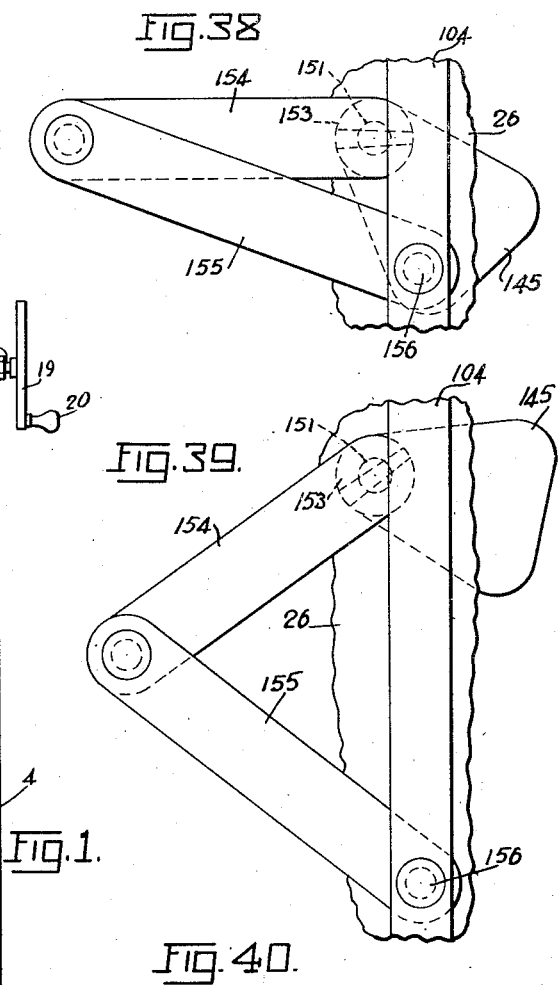
EARL E. EICKMEYER,
ANTHONY G. HORVATH,
Inventors
By Toulmin & Toulmin
Attorneys

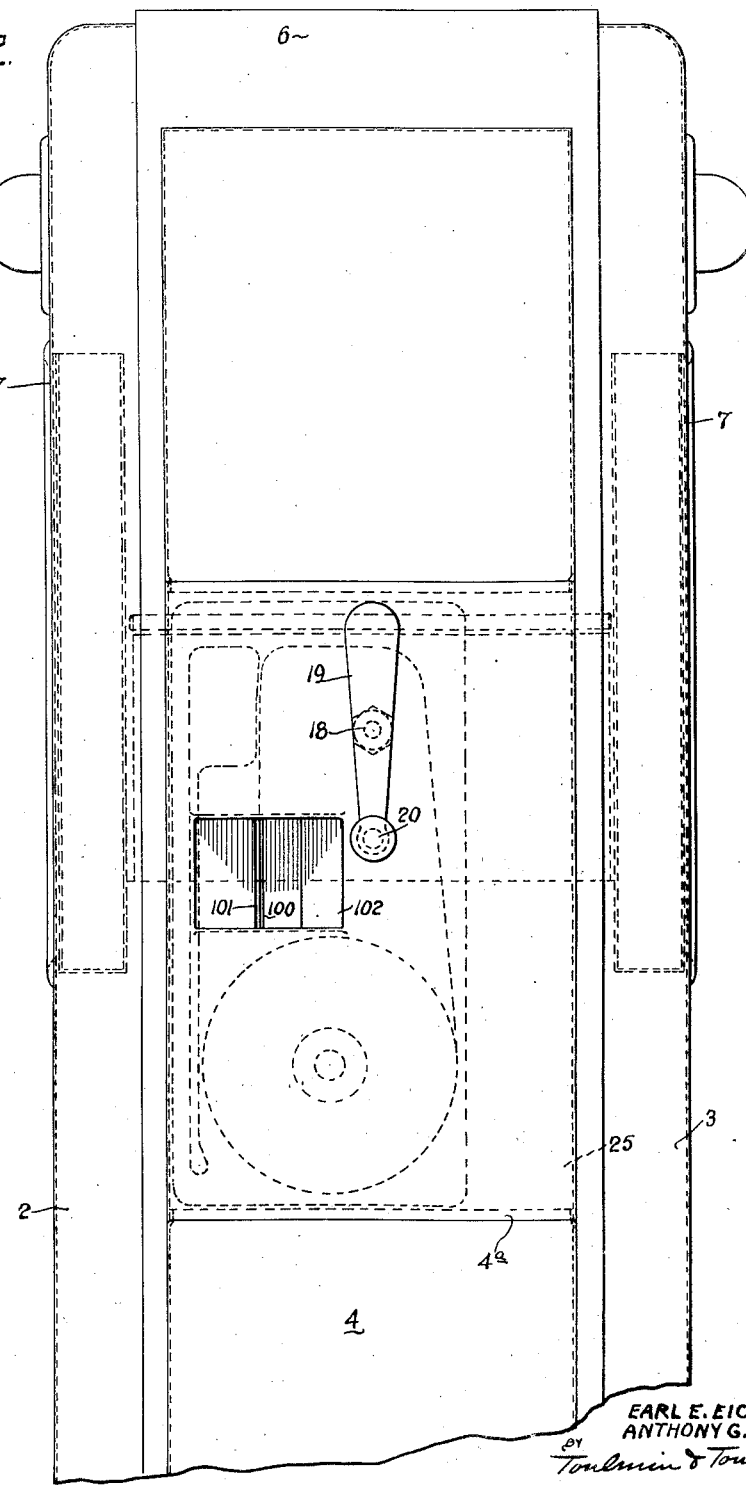

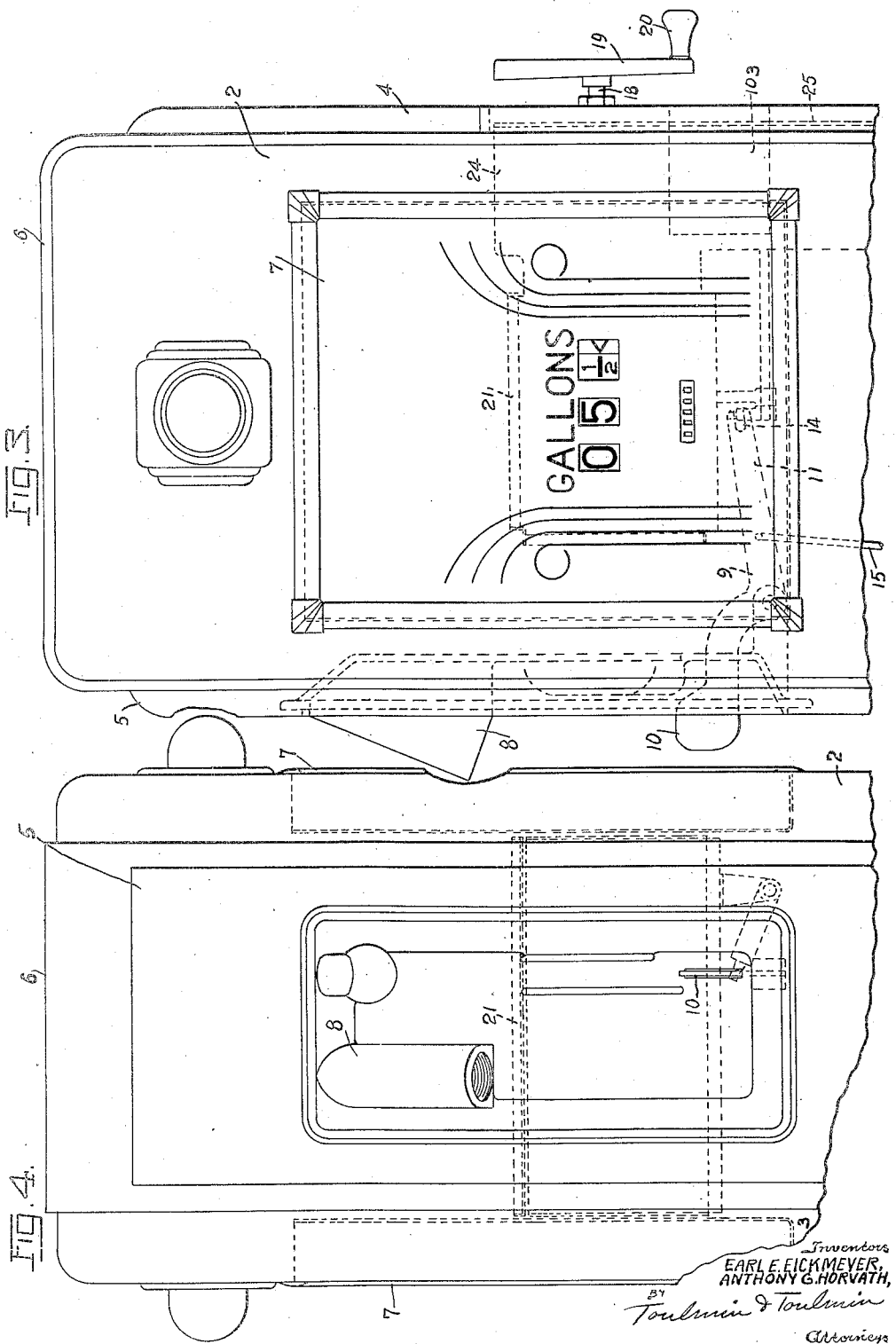

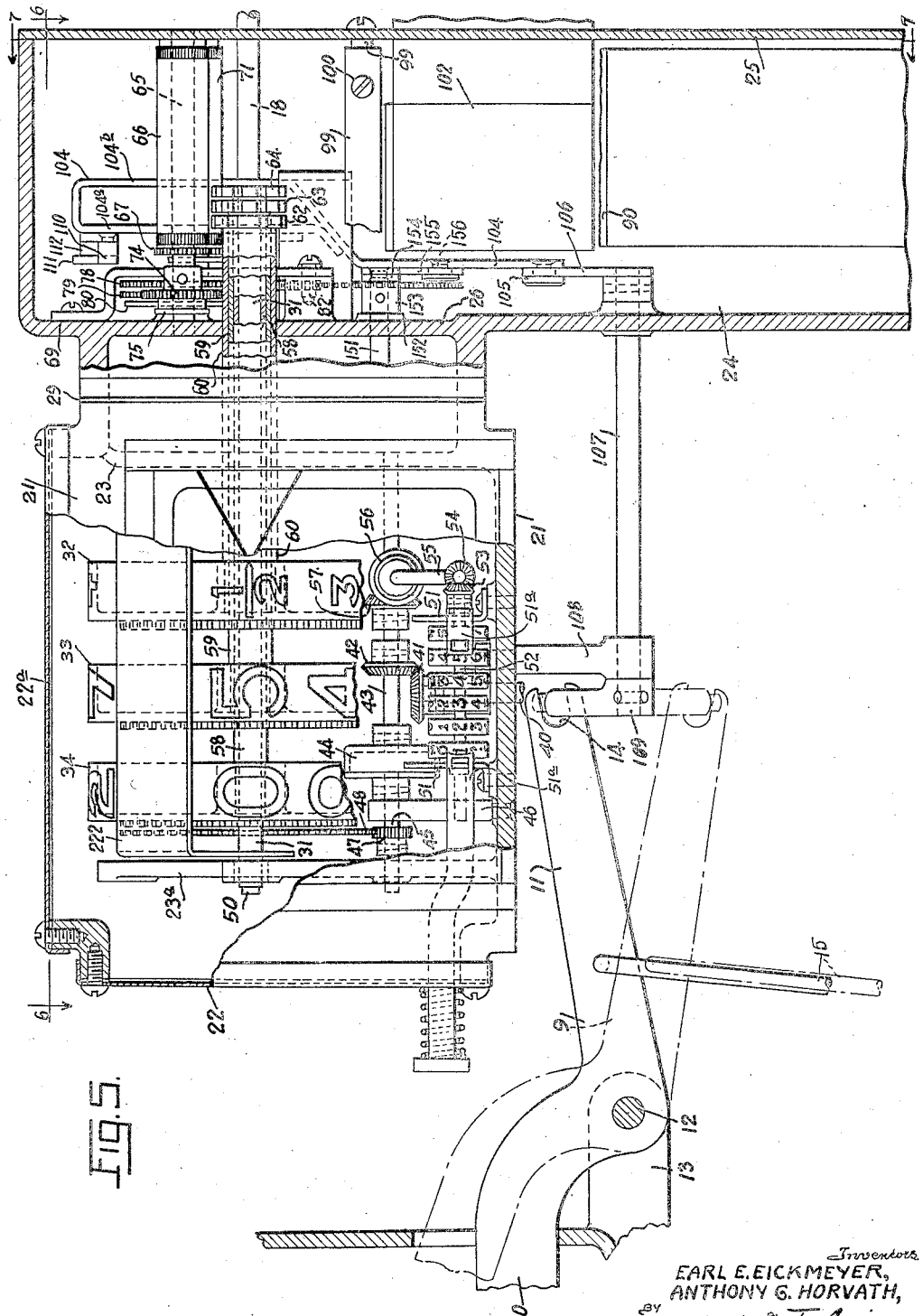

Aug. 31, 1943.  E. E. EICKMEYER ET AL  2,328,435
TICKET ISSUING FUEL DISPENSING APPARATUS
Filed Feb. 16, 1938  13 Sheets-Sheet 5

Inventors
EARL E. EICKMEYER,
ANTHONY G. HORVATH,
BY
Toulmin & Toulmin
Attorneys

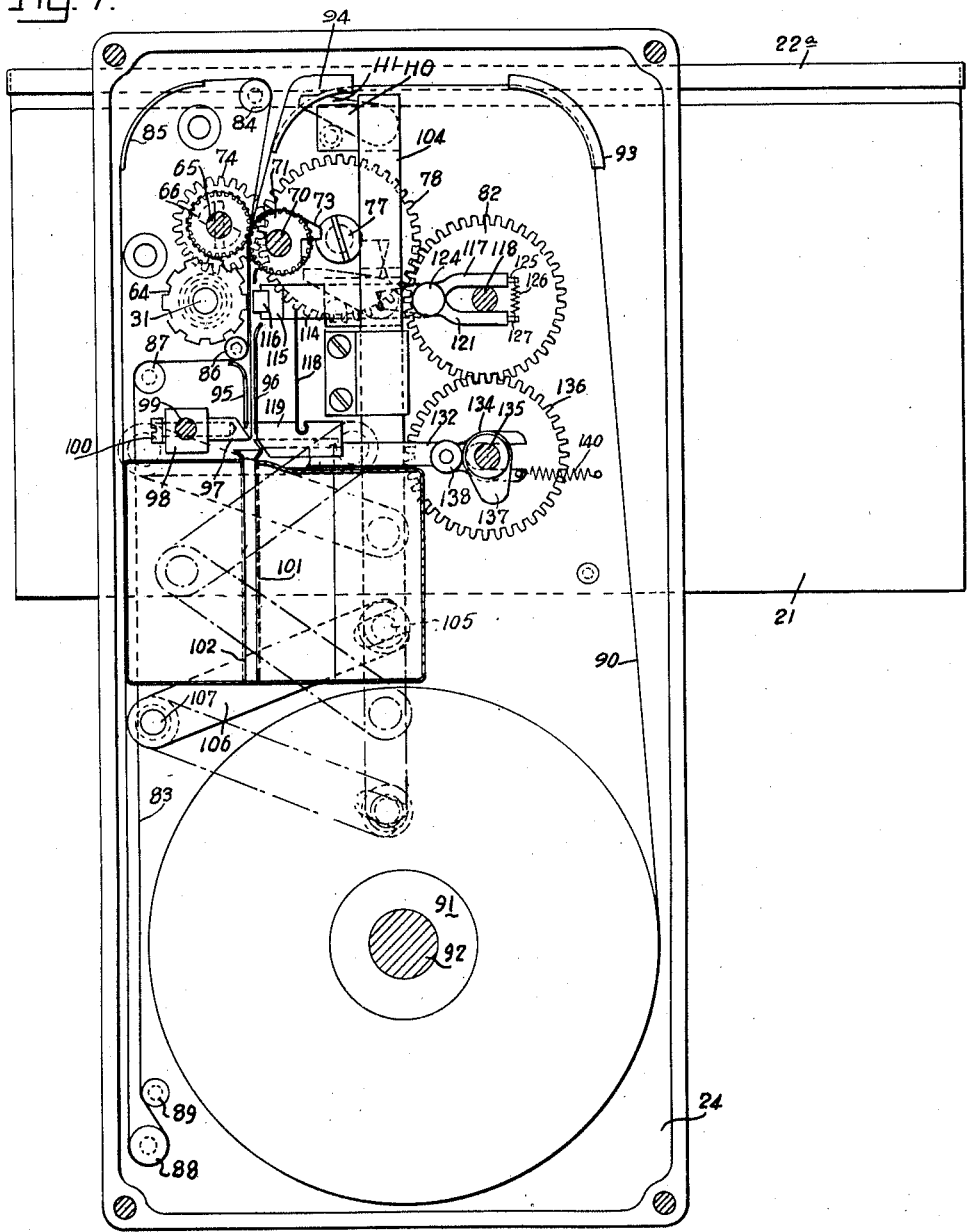

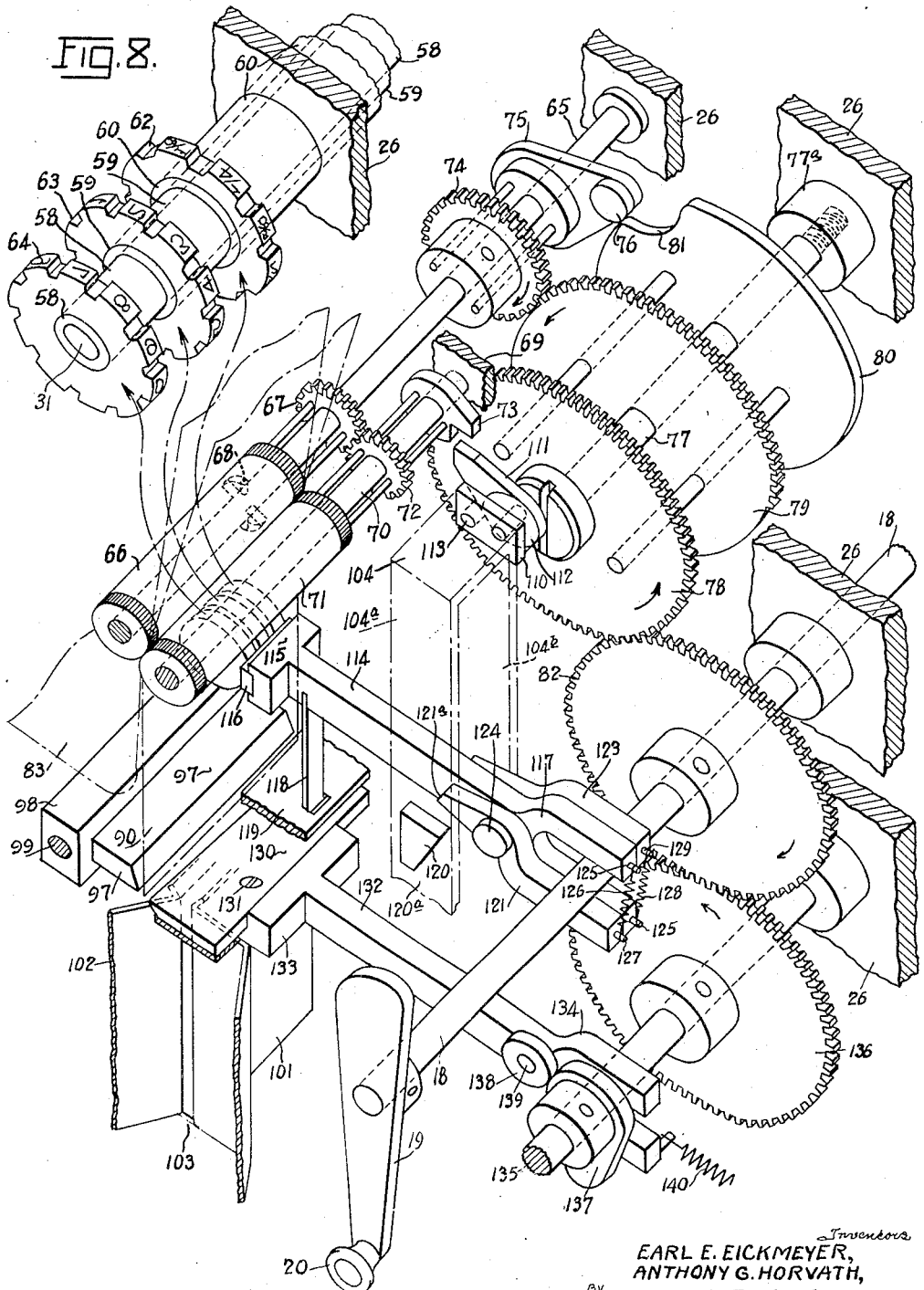

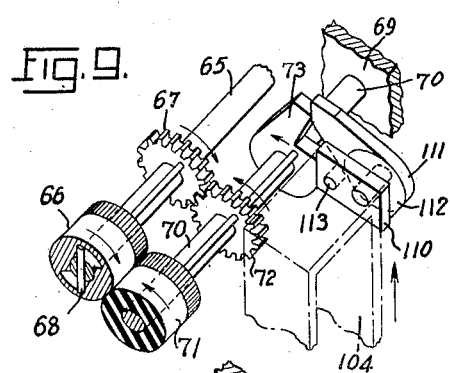
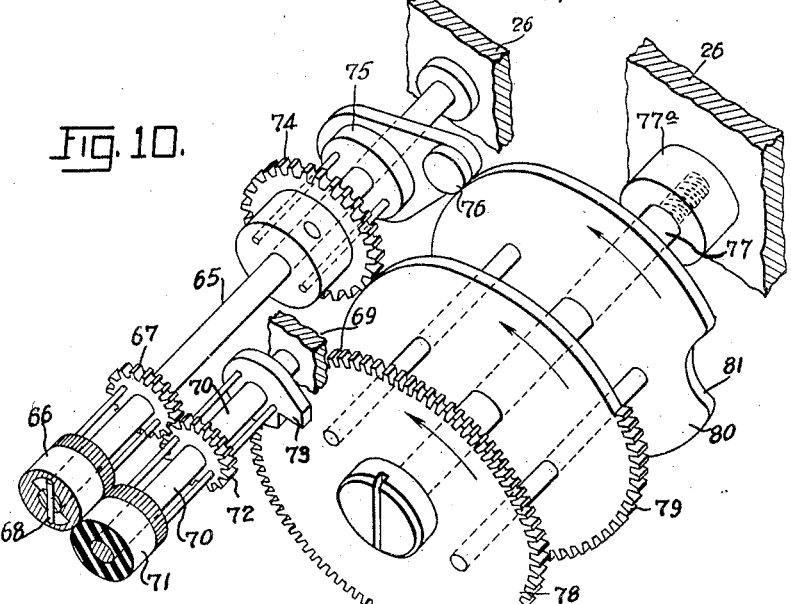
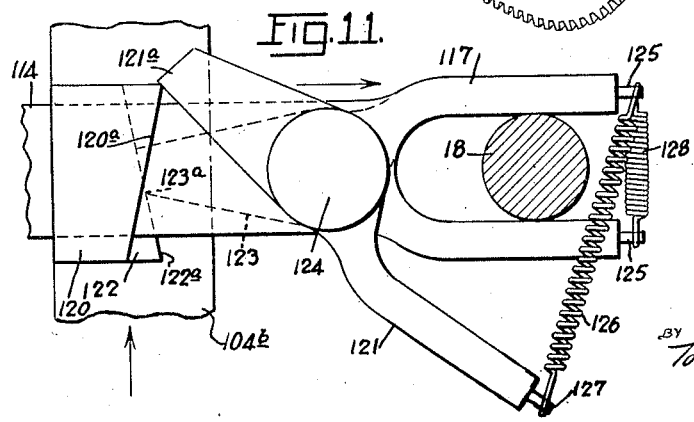

Inventors
EARL E. EICKMEYER,
ANTHONY G. HORVATH,
By Toulmin & Toulmin
Attorneys

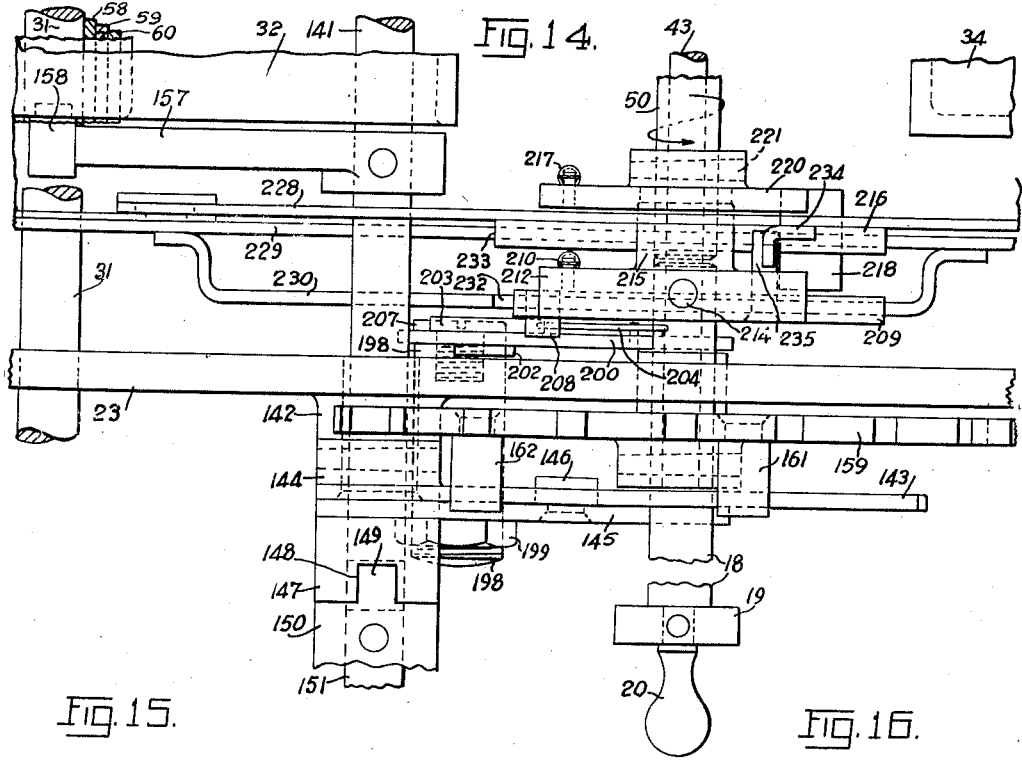
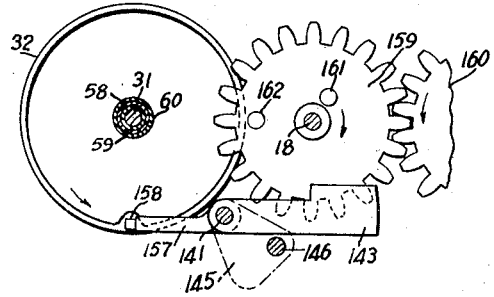
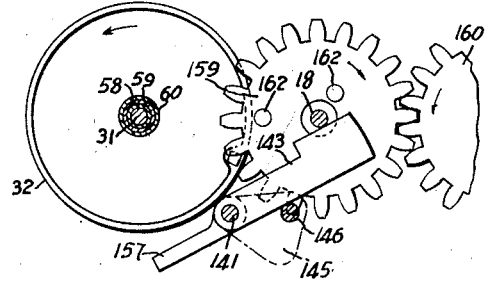
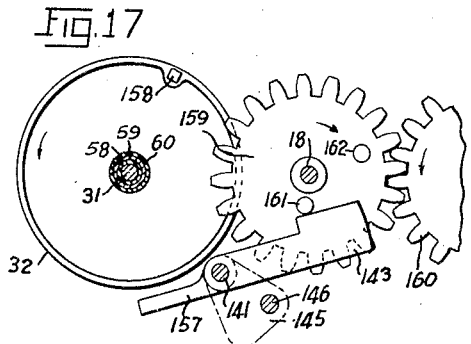
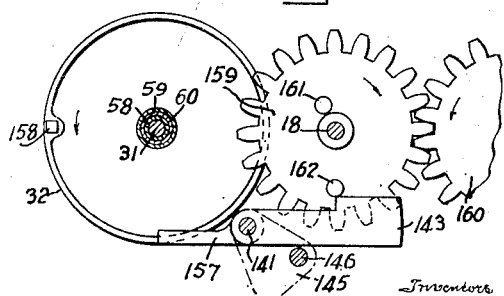

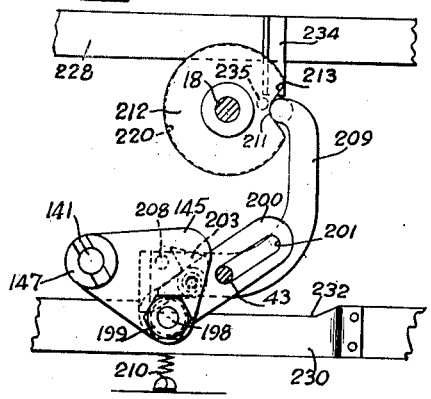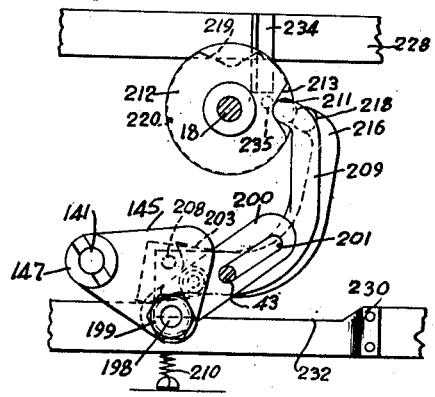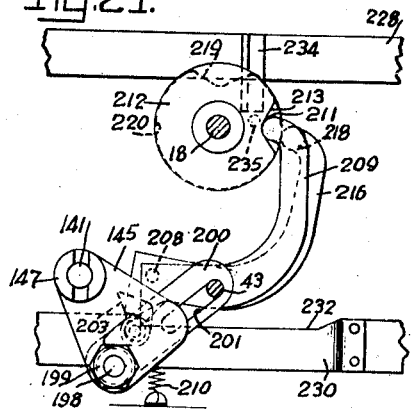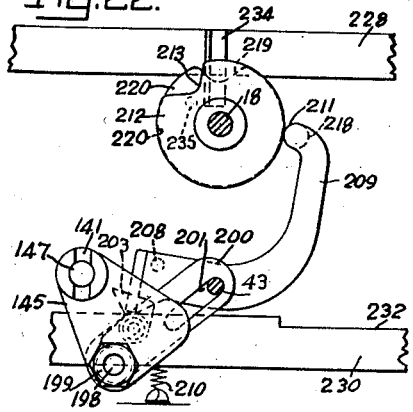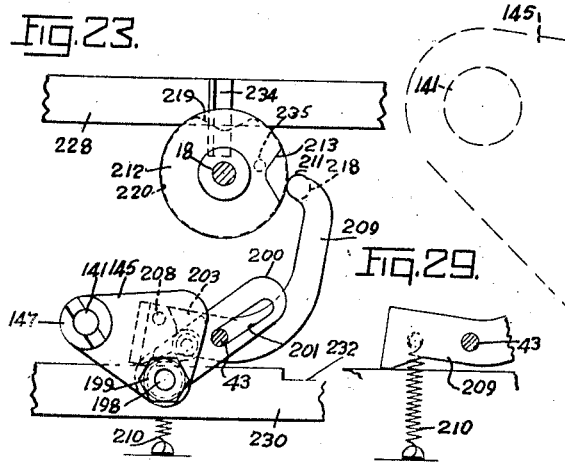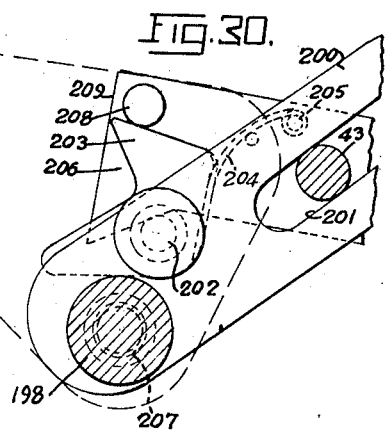

Aug. 31, 1943.    E. E. EICKMEYER ET AL    2,328,435
TICKET ISSUING FUEL DISPENSING APPARATUS
Filed Feb. 16, 1938    13 Sheets-Sheet 12
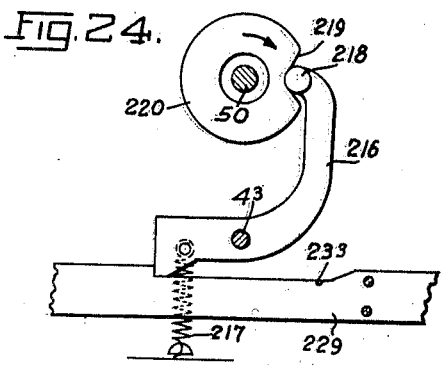
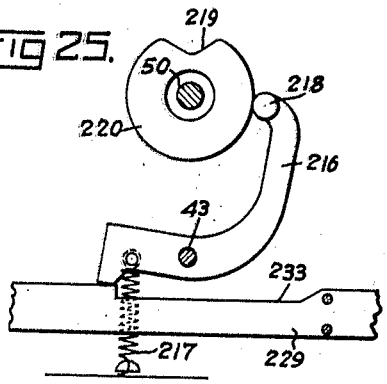
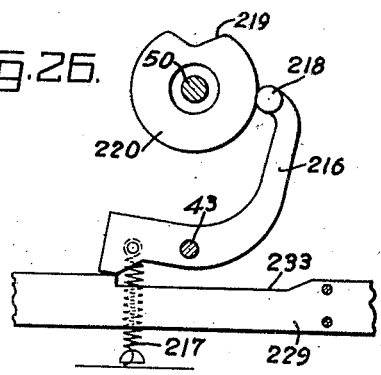
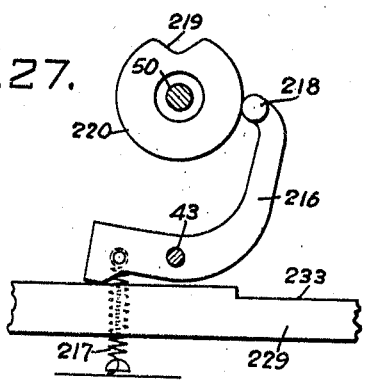
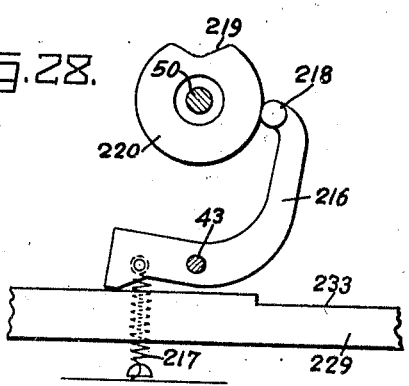
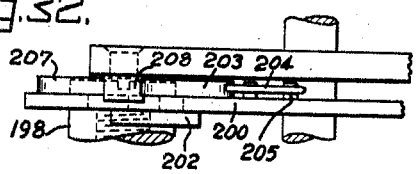
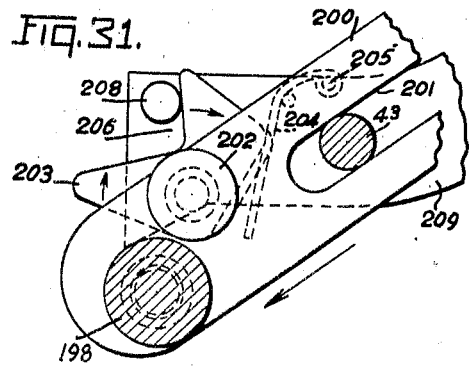
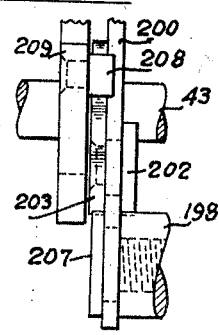
Inventors
EARL E. EICKMEYER,
ANTHONY G. HORVATH,
BY Toulmin & Toulmin
Attorneys

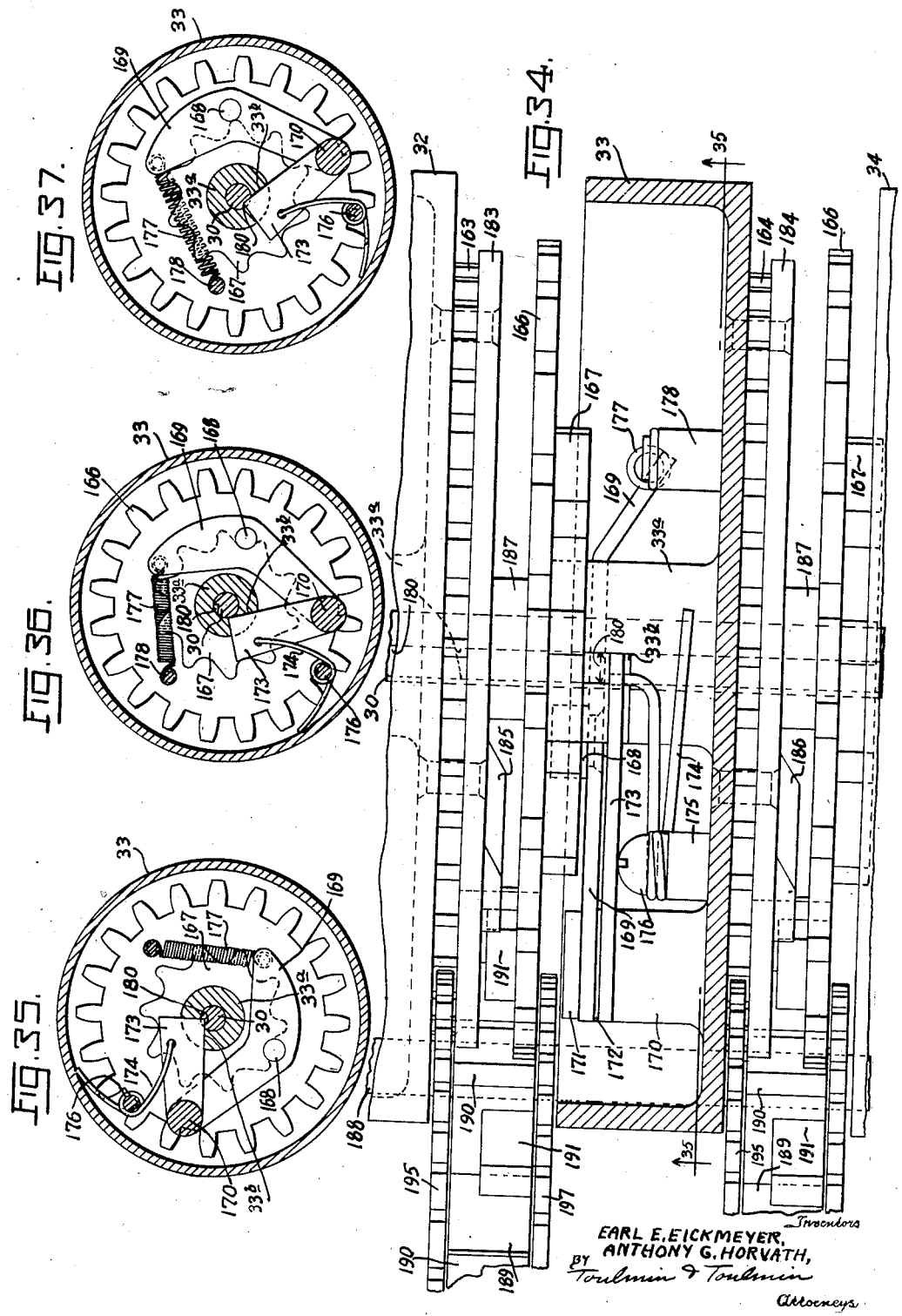

Patented Aug. 31, 1943

2,328,435

UNITED STATES PATENT OFFICE 2,328,435

TICKET ISSUING FUEL DISPENSING APPARATUS

Earl E. Eickmeyer and Anthony G. Horvath, Dayton, Ohio, assignors to The Dayton Pump & Manufacturing Company, Dayton, Ohio, a corporation of Ohio Application February 16, 1938, Serial No. 190,772

7 Claims. (Cl. 221—95)

This invention relates to fuel dispensing apparatus, and particularly to fuel dispensing apparatus in the form of recording pumps particularly adapted for the protection, from fraud, of buyers of fuel dispensed therefrom.

It is an object of this invention to provide means and a method of operation of fuel pumps whereby to issue to each purchaser of gasoline, kerosene or other fuel dispensed therefrom, a ticket recording the exact amount of fuel dispensed to the purchaser, by the pump. in order to protect the buyer from overpayment due to short measure, either intentional and fraudulent, or unintentional and inadvertent.

It is a further object of this invention to provide for the issuance, to each purchaser of fuel from a fuel dispensing pump, of a sales ticket or receipt having registered thereon the quantity zero denoting that the pump indicator was reset to zero before the dispensing operation was begun and to, thus, prevent the purchaser from being charged for a previously registered quantity which he did not receive at the time of his purchase.

It is a further object of this invention to insure that the pump indicator means shall be reset to zero reading after each dispensing operation by providing mechanism automatically operative, upon failure so to reset the indicator, to mask or obscure the indicator dial during a succeeding dispensing operation (without resetting of the indicator mechanism) to prevent the operator of the pump from seeing the dial, while carrying out that particular dispensing operation.

It is a further object of this invention to indicate on the buyer's receipt ticket that the pump has not been reset to zero before the dispensing operation has begun, when such is not the case.

It is a further object of this invention to provide for the issuance of a record receipt to a fuel purchaser, which may be retained by him for record purposes.

It is a particular object of this invention to perform the following sequence of operations and to provide means for doing so:

A pump of any conventional type is driven by a motor for pumping gasoline through a meter or equivalent mechanism which actuates an indicator and at the same time proportionately moves printer wheels to print the same numerical indication as visibly indicated by the indicator. This operation is initiated by lifting the delivery hose, supplied by fluid through the meter, from its hook and the movement of the hook so as to bring about the initial printing from the printer wheels which are at that time in their zero position.

As the gasoline or other fuel is delivered, the visual indicator wheels turn and indicate the gallons being delivered and simultaneously the printer wheels are being continuously moved to give a similar indication. Upon the completion of the delivery of the desired amount, the hose is re-hung on the hook which thereby closes the motor switch and stops the delivery of gasoline and at the same time brings about a printing operation from the printer wheels which have the same indication at that moment as the visual indicator has.

No delivery of the printed slip has as yet been effected. This is effected by the operation of a manual delivery means which is also the resetter for returning the visual indicator and the printing wheels to initial zero position for another operation. This may be either a severing means as a means of delivery or it may be a movement of the strip to a new position so that it can be torn off as preferred.

By the foregoing operation of the mechanism of this invention, the quantity of fuel flowing performs a dual operation of visually indicating the quantity of fuel delivered and at the same time of providing means for recording the state of the indicator at the beginning and end of the fuel delivery operation.

These and other objects and advantages will appear from the following description taken in connection with the drawings.

In the drawings:

Figure 1 is a front view, in elevation, of a pump equipped according to the principles of this invention;

Figure 2 is a fragmentary right side elevation of structure shown in Figure 1;

Figure 3 is an enlarged fragmentary detail view of the front of the pump illustrated in Figures 1 and 2;

Figure 4 is a fragmentary left side elevation of the pump;

Figure 5 is a fragmentary enlarged detail view, partly in section, of a portion of the pump indicating and receipt ticket issuing mechanisms shown in outline, in dotted lines, in Figure 3;

Figure 7 is a section taken on the line 7—7 of Figure 5;

Figure 8 is an exploded, diagrammatic perspective view of the receipt ticket printing, severing and issuing mechanism shown in Figure 7;

Figure 9 is a fragmentary exploded diagrammatic perspective view showing the mechanism for advancing the receipt ticket between printing of the initial and final quantities thereon;

Figure 10 is a view similar to Figure 9, but showing the mechanism for feeding the ticket web in predetermined ticket lengths, with the feed limiting means in operation;

Figure 11 is an enlarged fragmentary view of the platen actuating mechanism shown positioning the platen member for subsequently printing, on the receipt ticket, the final quantity;

Figure 14 is an enlarged fragmentary view of structure shown in Figure 6;

Figure 15 is a simplified diagrammatic view of the indicator drum positioning and locating means shown in Figure 12, with the parts shown in the starting position which is identical with the final reset position;

Figure 16 is a view similar to Figure 15, but showing the parts in the position taken upon completion of a dispensing operation and before restoration of the hose to the hose hook;

Figure 17 is a view similar to Figure 16, but showing the parts in the position taken, after restoration of the hose to the hose hook, in the first stage of the indicator mechanism resetting operation;

Figure 18 is a view similar to Figure 17, but showing the parts in the position taken in the second stage of the indicator mechanism resetting operation;

Figure 19 is a simplified diagrammatic view of the shutter operating means, shown in the starting position in Figure 12, with the parts in the position taken immediately after the hose hook is manually raised to initiate fuel delivery by the pump;

Figure 20 is a view similar to Figure 19, but showing the parts in the position taken during the delivery of fuel by the pump;

Figure 21 is a view similar to Figure 20, but showing the parts in the position taken after the hose is returned to the hose hook;

Figure 22 is a view similar to Figure 21, but showing the parts in the position taken during resetting of the indicator means;

Figure 23 is a view similar to Figure 21, but showing the parts in the position taken subsequent to the position of Figure 1, when resetting (Fig. 22) is omitted and the hose hook is manually raised preparatory to a second delivery of fuel without resetting of the indicator means to zero reading;

Figure 24 is a simplified diagrammatic view of a portion of the shutter operating means illustrated in Figures 19 to 23 inclusive, showing mechanism which is obscured by that shown in Figure 19, with the parts in the position illustrated in that figure;

Figure 25 is a view similar to Figure 24, but showing the illustrated parts in the position of Figure 20;

Figure 26 is a view similar to Figure 25, but showing the illustrated parts in the position illustrated in Figure 21;

Figure 27 is a view similar to Figure 26, but showing the illustrated parts in the position of Figure 22;

Figure 28 is a view similar to Figure 27, but showing the illustrated parts in the position of Figure 23;

Figure 29 is a fragmentary detail view, in elevation, of structure shown in Figures 19 to 23;

Figure 30 is an enlarged fragmentary detail view of structure shown in Figures 19 to 23 inclusive, showing the parts in a position intermediate the starting position (shown in Figure 12) and the position shown in Figure 19;

Figure 31 is a view similar to Figure 30, but showing the parts in a position taken intermediate the position of Figure 20 and that of Figure 21;

Figure 32 is a fragmentary plan view of the structure shown in Figure 31;

Figure 33 is a fragmentary view, in elevation, of the structure shown in Figure 31, as seen from the left of Figure 31, looking toward the right;

Figure 34 is an enlarged fragmentary detail plan view of the transfer drive between adjacent indicator drums with one of the drums in horizontal section to show the driving means contained therein;

Figure 35 is a reduced vertical section taken on the line 35—35 of Figure 34, showing the indicator drum driving mechanism in starting position;

Figure 36 is a view similar to Figure 35, but showing the drum driving parts in the position taken after fuel delivery;

Figure 37 is a view similar to Figure 36, but showing the parts in the position taken during resetting of the indicator drums by operation of the resetting mechanism;

Figure 38 is a fragmentary view, in elevation, of a portion of the mechanism illustrated in Figure 7, with the parts in the starting position;

Figure 39 is a view similar to Figure 38, but showing the parts in the position taken after the hose hook has been manually raised for initiation of fuel delivery; and Figure 40 is a plan view of a receipt ticket as printed, severed, and issued by apparatus of this invention.

Figure 6:
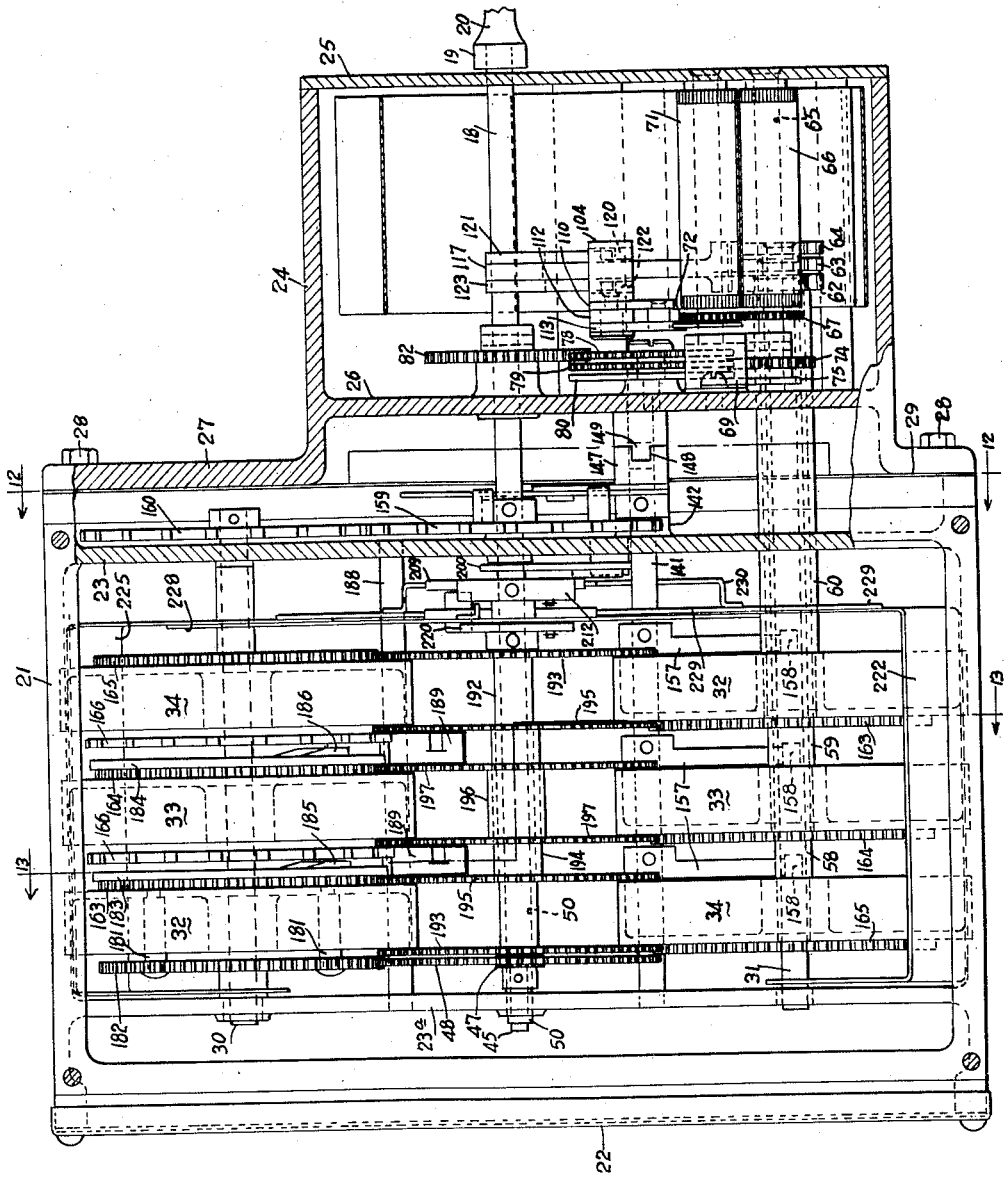
Figure 6 is a section taken on the line 6—6 of Figure 5.

Formerly, in the operation of conventional fuel dispensing pumps, it was possible for the operator to begin a fuel dispensing operation without resetting the pump indicator to zero and thus to cause to be registered upon the pump indicator an amount in excess of the actual amount of fuel dispensed to the purchaser. This enabled the operator of the pump to charge the purchaser, fraudulently, for an amount of fuel in excess of the amount actually received by the purchaser.

According to the principles of this invention, this fraudulent practice is prevented by the provision of means, which may take the form of an attachment to known forms of pump structures, or which may be built therein, as a part thereof, for printing and issuing a receipt ticket for each dispensing operation, having thereon the original and final settings of the pump indicator, by means of which the buyer may carefully check the amount of fuel for which he is charged.

The mechanism is preferably provided with means connecting it to the hose hook of the pump in such manner that the position of the printing of the starting quantity on the receipt ticket may not properly occur unless the indicator of the pump has been reset to zero before the particular dispensing operation, whereby the improper location of the designation of the original quantity registered by the pump, or the absence of the quantity 0—0 from the proper place on the receipt ticket may, at once, warn the purchaser of fraudulent, inadvertent or improper operation of the pump by the operator.

Furthermore, the mechanism is so connected to the shutter operating means that the shutters are placed over the indicator dials of the pump whenever a dispensing operation is begun without previously resetting the pump indicating mechanism to zero to thus prevent the pump operator from observing the dial and thus estimating the quantity delivered by the pump.

Referring to the drawings in detail, in Figures 1 to 4 inclusive, we have shown a conventional form of motor operated pump with the principles of this invention applied to the indicator means and shutter operating means thereof. The details of the conventional internal structure of the pump are omitted in the interest of clearness. The casing of the illustrated pump comprises a pedestal 1 having extending upwardly therefrom a front side wall 2, a rear side wall 3, a right side wall 4 and a left side wall 5.

The right and left side walls, 4 and 5, are preferably formed of the same sheet material which forms the top wall 6 therebetween, as shown in Figures 1 and 3. The front wall 2 and the rear wall 3 are preferably provided with window means 7 for providing vision of the front and rear dial plates. The front and rear dial plates are provided with suitable apertures which cooperate with numeral-carrying indicator drums for indicating the amount of fuel dispensed by the pump at a particular time during a dispensing operation and each dial plate is also provided with a grand total aperture cooperating with register means indicating the total gallonage dispensed by the pump.

In the form of pump illustrated, the hose outlet 8 extends outwardly from the left side of the pump casing and is adapted to have the pump hose screw-threadedly attached thereto. Adjacent the hose outlet 8, the left side of the casing is provided with an inwardly offset portion from which extends outwardly, through a suitable slot therein, the outer end 10 of the pump hook or pump hook lever 9, which is pivoted at 12 to a bracket or ear 13 extending inwardly from the left side wall 5 of the casing. The pump hook or pump hook lever 9 has the inner end portion thereof extending inwardly into the pump casing and provided with a forked inner extremity designated 14. The pump hook or pump hook lever 9 is thus swingably mounted in such manner that, when the hose nozzle is hung thereon, the inner forked extremity 14 thereof will be swung upwardly, and when the hose nozzle is removed from the outer end 10 of the pump hook lever 9, the outer end 10 thereof may be manually thrust upwardly to swing the inner extremity 14 thereof downwardly.

In order that the pump hook lever 9 shall control the starting and stopping of the pump, a link 15 has the upper end thereof pivotally secured to the inner end portion 11 of the lever 9 and the lower end thereof operatively secured in suitable manner to the control switch 16 of the pump operating motor 17. Thus, when the hose nozzle is hung upon the outer end 10 of the hose hook, the link 15 is drawn upwardly to open the motor switch 16 and stop the motor 17. Likewise, when the hose nozzle is removed from the outer end 10 of the hose hook or hose hook lever 9, the outer end 10 thereof may be manually thrust upwardly to thrust the link 15 downwardly to close the switch 16 and cause the pump operating motor 17 to be started.

Extending outwardly from the right side wall 4 of the pump casing is the rotatable resetting shaft 18 having the lever 19 rigidly secured at its outer end provided at one end with the handle 20. By engaging the handle 20, the pump operator, subsequent to the completion of a dispensing operation, may rotate the shaft 18 to reset the indicator drums of the pump to the zero position.

Disposed between the spaced oppositely disposed dial plates in the pump casing is an indicator mechanism casing, generally designated 21, which is positioned, as indicated in dotted lines in Figures 3 and 4, and which, as shown in Figures 5 and 6, encloses the indicator drums. As shown in Figures 5 and 6, the plate 22 forms the inner end wall of the casing 21 which is disposed toward the left side wall 5 of the pump casing. The upper wall of the casing 21 is formed by a similar plate 22a. The plates 22 and 22a are secured to the body of the casing 21 by means of screws, as shown in Figure 5. At its right-hand end, the casing 21 has a vertical wall 23 formed integrally therein, and spaced inwardly of the casing from the right end portions of the walls thereof.

Rigidly secured in the pump casing to the right of the indicator casing 21 is the casing 24 which encloses the receipt ticket printing, severing and issuing means which comprises a part of this invention. At the right side, the casing 24 is closed by a cover plate 25 which is suitably secured to the top, bottom, and side walls thereof. Integrally formed with the top, bottom and side walls of the casing 24 is the inner vertical wall 26 which is disposed in spaced relation and in parallelism with the wall 23 of the indicator casing 21.

Extending from the inner side wall of the casing 24 is the attaching flange 27 which is secured by means of bolts 28 (Fig. 6) to the right-hand end of the indicator casing 21, a suitable protective gasket 29 being disposed therebetween, as shown in Figures 5 and 6. A suitable aperture is provided in the right side wall 4 for providing access to the cover plate 25, the aperture being closed by a suitably removable plate 4a which closes the aperture in the right side wall 4 of the pump casing (Fig. 2).

In the casing 21 disposed toward the left or inner end thereof, in inwardly spaced relation to the end plate 22 and in parallelism with the wall 23, is a wall 23a. Supported for rotation in the casing 21, at the rear side thereof by the walls 23 and 23a, is a shaft 30 which supports the rear bank of indicator drums, as shown in Figure 6. A similar shaft 31 is likewise supported for rotation at the forward side of the casing 21, and this shaft extends rightwardly into the casing 24, as shown in Figures 6, 7 and 8, for a purpose which will hereinafter more clearly appear.

As shown in Figures 5 and 6, the righthand forward drum and the lefthand rear drum, designated 32, indicate fractional portions of a gallon, while the central forward and rear drums 33 designate gallons from 0 to 9 inclusive, while the righthand forward drum and lefthand rear drum, designated 34, designate gallons from 10 to 90 inclusive. By means hereinafter more clearly described, the drums 32 rotate simultaneously, together, in synchronism, while the same relation is maintained between the drums 33 and between the drums 34 in order that the same amount may be registered by the dial plate at each side of the pump casing. Such operative connection is provided between one set of drums 32, 33 and 34, that a full revolution of the drum 32 must occur to cause one-tenth of a revolution of the drum 33, while a complete revolution of the drum 33 must occur to cause one-tenth of a revolution of the drum 34.

Figure 12:
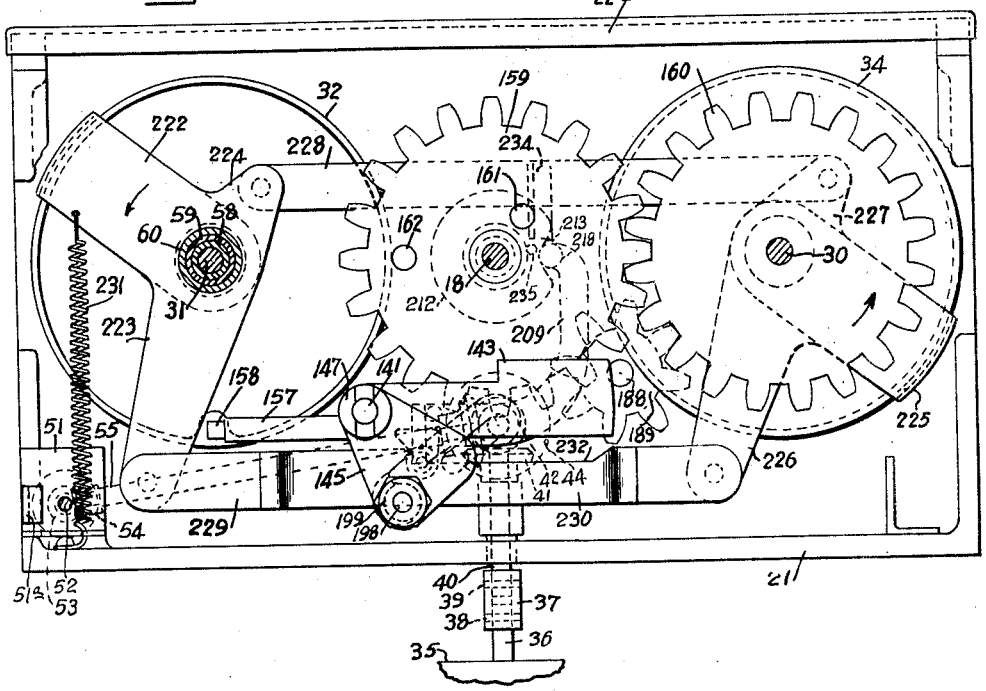
Figure 12 is a section taken substantially on the line 12—12 of Figure 6.

The meter mechanism of the pump is conventional and, as shown in Figure 12, the shaft 36 thereof has a tubular connector member 37 pinned thereto by means of the pin 38. This tubular connector member 37 is connected by means of the shear pin 39 to the shaft 40 which is thus driven directly from the meter 35. In case of obstruction or excessive binding in the indicator mechanism, the shear pin 39 will be severed, to break the drive connection between the shaft 36 of the meter and the shaft 40 and thus permit the meter 35 to operate independently of the indicator mechanism and prevent breakage, or other damage to the indicator mechanism.

Referring again to Figures 5 and 6, it will be seen that the shaft 40 extends vertically upwardly through the lower wall of the casing 21 and has rigidly secured to the upper end thereof the bevel gear 41. This bevel gear 41 meshes with the bevel gear 42 which is pinned to the shaft 43. The shaft 43 is suitably rotatably supported at the right end in the casing 21, and the left end thereof is supported by the overrunning clutch mechanism 44 secured to the end thereof.

Also connected to the overrunning clutch 44 is a shaft 45 which is rotatably supported by the wall 23a and the bracket 46 (Fig. 5). Rigidly secured to the shaft 45 between the wall 23a and the bracket 46 is the pinion 47 which meshes with the gear 48. The gear 48 is rigidly secured to the left end of a shaft 50 which has one end rotatably supported in the wall 23a, while the other end thereof is supported by means and in a manner which will hereinafter more clearly appear. The gear 48, as hereinafter more clearly described, meshes with the drive gear of the rearmost indicator drum 32, as shown in Figure 6.

The means for transmitting the drive from the rearmost indicator drum 32 to the rearmost indicator drum 33, and from the rearmost indicator drum 33 to the rearmost indicator drum 34, as well as the drive between the forward and rear drums 32, the forward and rear drums 33 and the forward and rear drums 34 are also hereinafter most clearly described.

Also driven from the shaft 43 is the indicator mechanism for indicating on the forward dial plate the total gallonage dispensed by the pump. This means comprises, as shown in Figure 5, a pair of spaced brackets 51 having rigid support on the bottom wall of the casing 21 and rotatably supporting the shaft 52 having at its end a bevel gear 53 which meshes with the bevel gear 54. The bevel gear 54 is rigidly secured to the outer and lower end of the inclined shaft 55 which has likewise rigidly secured to its upper and inner end a bevel gear 56 which meshes with a gear 57 rigidly secured to the righthand end of the shaft 43 (Fig. 5).

Mounted on the shaft 52 between the brackets 51 are a plurality of indicator drums which are suitably driven in conventional manner from the shaft 52 so that the righthand drum must rotate ten revolutions to cause one revolution of the second, and the second must rotate ten revolutions to cause one full revolution of the third, while the third must rotate ten revolutions to cause one full revolution of the fourth, the fourth must rotate ten full revolutions to cause one full revolution of the fifth, and the fifth must rotate ten full revolutions to cause one full revolution of the sixth. The righthand drum, therefore, registers gallons in tenths, the second in units, the third in tens, the fourth in hundreds, the fifth in thousands, and the sixth in tens of thousands.

In order that the grand total of the machine may be obscured for a purpose which will hereinafter more clearly appear, the masking plate 51a is provided, which is normally disposed over that portion of the indicating dials which are aligned with the side aperture in the front indicator plate. This masking plate 51a is provided with suitable controls (Figs. 5, 12 and 13) which are provided for occasional operation only so that inspectors may have access to the grand total, according to the principles of this invention.

It will thus be seen that when the hose nozzle is supported on the outer end 10 of the hose hook lever 9, the motor 17 will be inoperative, as will also the pump, and that when the outer end 10 of the hose hook 9 is manually swung upwardly, the motor 17 is started to cause operation of the pump and, concurrently therewith, of the meter 35. Rotation of the shaft 36 of the meter 35 will be transmitted, as above described, through shaft 43, pinion 47 and gear 48, to cause the amount dispensed by the pump to be registered by the respective indicator drums 32, 33 and 34, while at the same time the shaft 52 will be rotated to register on the front dial of the pump the total gallonage pumped by the pump since its installation.

As shown in Figure 6 and as briefly described above, the rear indicator drums 32, 33 and 34 are driven from the gear 48, and from these rear indicator drums 32, 33 and 34, means of synchronous connection is provided between the indicator drums 32, indicator drums 33 and indicator drums 34 in such manner that the forward indicator drums 32, 33 and 34 are driven synchronously from the gear 48.

As also described above, the shaft 31 extends rightwardly into the casing 24, as shown in Figures 5, 6, 7 and 8. The forward lefthand indicator drum 34 has rigidly secured thereto the left end of the sleeve 58 which is rotatably supported on the shaft 31. Superposed on this sleeve 58 for rotation thereon is the sleeve 59 which has the left end thereof rigidly secured to the forward indicator drum 33. Superposed on and rotatable on the sleeve 59 is the third or outer sleeve 60 which has the forward indicator drum 32 rigidly secured to its left end.

Rigidly secured to the right end of the outer sleeve 60 for rotation with this sleeve and with the rigidly attached indicator drum 32 is the rotary type disk member 62. Disposed to the right of the type disk member 62 and rigidly secured to the end of the intermediate sleeve 59 for rotation therewith and with the rigidly attached indicator drum 33 is the intermediate rotary type disk member 63. A third rotary type disk member 64 is rigidly attached to the right end of the inner sleeve 58 for rotation therewith and with the rigidly attached indicator drum 34.

The disposition of the type disk members 62, 63 and 64 is shown particularly in Figures 5 and 6, wherein it will be seen that the type disk 64, which rotates with the indicator drums 34 for registering tens, is farthest from these members, and that the type disk member 62, which rotates with the indicator drums 32, is closest these members, and that the intermediate type disk member 63, which rotates with the intermediate indicator drum 33 for indicating units, is disposed intermediate the fractional type disk member 62 and the tens type disk member 64.

Journaled at its inner end in the wall 26 of the casing 24 and at its outer end in suitable bearing means provided in the cover plate 25 is the freely rotatable shaft 65 which has secured thereon for limited rotation the printing roll 66 and its drive gear 67 which is pinned thereto.

The printing roll 66 may be termed a type roll, because it is provided with a type facing adapted, in a manner hereinafter more clearly described, for printing an impression on a paper strip or web passing thereover. The manner of securing the printing roll to the shaft 65 for limited free rotation is shown in Figures 9 and 10, wherein it will be seen that a pin member 68 extends through the shaft 65 and has its ends, at opposite sides of the shaft 65, disposed in arcuate recesses in the roll 66 in such manner that a predetermined amount of relative rotation between the roll 66 and shaft 65 is permitted.

Rigidly secured in spaced relation to the wall 26 and in parallelism therewith is a bracket plate 69, as shown in Figures 5 and 6. A shaft 70 is disposed adjacent and in parallelism with the shaft 65 with one end thereof journaled in the bracket 69 and the other end thereof suitably journaled in means provided in the cover plate 25. Rigidly secured to the shaft 70 for rotation therewith is the resilient pressure roll member 71 of rubber or other suitable material, having rigidly pinned thereto, adjacent one end, a gear 72 which meshes with the gear 67 on the printing roll 66, and pinned to the gear 72 is a finger member 73. Pinned to the shaft 65 for rotation therewith is the pinion 74 to which is pinned the cam follower member 75 having the antifriction roller 76 at its outer end.

The wall 26 is provided with a boss 77a, to which is screw-threadedly secured a stud 77 upon which is rotatably secured at the outer end of the stud 77 the driving gear 78, to which driving gear 78 is pinned at its inner side the mutilated gear 79. The mutilated gear 79 is in alignment with the pinion 74 and cooperates therewith in a manner hereinafter more clearly described, to predeterminedly rotate the shaft 65 through one complete rotation in order that a full revolution of the type face of the printing roll 66 may occur upon each full rotation of the mutilated gear 79. Pinned to the inner side of the mutilated gear 79 for rotation therewith is a rotary cam member 80 having its peripheral portion provided with a suitable notch 81 which cooperates with the roller 76 on the cam follower member 75 in a manner which will hereinafter more clearly appear.

It will be clearly seen from the above that the driving gear 78, mutilated gear 79 and cam member 80 rotate together, and the means for rotating the driving gear 78 comprises the reset gear 82 which meshes with the driving gear 78 and which is pinned to the above described reset shaft 18 in such manner that rotation of the shaft 18 for resetting the indicator drums will cause the reset gear 82 to rotate in clockwise direction, as seen in Figure 8, to cause counterclockwise rotation of drive gear 78, mutilated gear 79, and cam member 80 in counterclockwise direction, as seen in Figures 8 and 10.

Upon rotation of the driving gear 78, mutilated gear 79 and cam 80, it will be seen that, as the teeth on the mutilated gear 79 engage the teeth of pinion 74 for rotation of the shaft 65, the roller member 76 engages the notch 81 in the cam member 80 to permit further counterclockwise rotation of the mutilated gear 79 and the cam member 80 and consequent clockwise rotation of the shaft 65 for one complete revolution. As soon as the shaft 65 has rotated through one complete rotation, the roller 76 will engage the circular peripheral portion of the cam member 80 to prevent further clockwise rotation of the shaft 65, as seen in Figure 8. This means insures that the printing roll 66 and the pressure roll 71, which is geared therewith through gears 67 and 72, shall rotate a predetermined amount to cause a predetermined amount of feed of the paper strip or web and the adjacent carbon web (hereinafter described) disposed therebetween, and to cause to be printed upon the paper web a full impression of the type on the printing roll 66. This impression will preferably take the form illustrated in Figure 32, save that the numerals appearing in parallelism with the words "initial" and "final" will not be printed thereon by the above described rotation of the printing roll 66.

In Figure 7, the carbon web, which is continuous, is designated 83. At the upper end, above the printing roll 66, this web or continuous strip 83 is supported by a freely rotatable roller 84 and arcuate stationary guide plate 85 immediately below the type disk members 62, 63 and 64. Freely rotatable rollers 86 and 87 support the web 83, while the lower end portion thereof is supported by the freely rotatable roller 88 in conjunction with the freely rotatable guide roller 89. The guide rollers 84, 86, 87, 88 and 89 are all pivotally supported by the casing having their pintles rigidly secured to the wall 26 and the inner lower wall of the casing 24.

The paper, in the form of a web 90, is wound in a roll upon the center member 91 which rotates freely on the pintle stud 92 which is rigid with the wall 26 and which extends outwardly therefrom to provide means for supporting the cylindrical center member 91 and the paper wound thereon. From the roll, the paper web 90 extends upwardly to the flanged arcuate guide plate 93 about which it passes and by which it is supported and it then extends over the flanged arcuate guide plate 94, and thence downwardly between the printing roll 66 and the resilient pressure roll 70. The paper web 90 and endless carbon web 83 are thus maintained in close contact between the printing roll 66 and the pressure roll 71.

Below the printing roll 66 and pressure roll 71, the paper and carbon webs pass downwardly between type disk members 62, 63 and 64 and a reciprocable platen member which is actuated at predetermined times to press the adjacent paper and carbon webs against predetermined portions of the type disk members 62, 63 and 64 for printing the initial and final quantities upon the receipt ticket.

After passing through the quantity printing zone, the carbon web 83 passes about the guide rollers 86 and 87, while the free end of the paper web passes downwardly between the forward ticket plate 95 and the rear ticket guide plate 96. Below and adjacent the forward ticket guide plate 95 is a stationary cutter blade 97 which is rigidly secured to a block 98 having its inner end rigidly secured to the wall 26 and its outer end secured to the cover plate 25 by means of the screw 99.

The rear end of the blade 97 extends into a slot in the block 98 and is rigidly secured therein by means of studs 100. This stationary blade 97 cooperates with a reciprocable blade, as hereinafter more clearly described, for severing predetermined lengths from the web 90 to form tickets as shown in Figure 32. From the severing zone, the paper passes between a pair of ticket guide plates 101 and 102 into a ticket issuing receptacle 103 (Figs. 2, 3 and 8), where it may be withdrawn through an aperture provided in the right side wall 4 of the pump casing.

The means for causing the rolls 66 and 71 to be predeterminedly advanced, within each feeding cycle, for moving the strip 90 a sufficient amount between the beginning of a dispensing operation and the end of the dispensing operation in order to cause advance of the ticket from the initial position wherein the "initial" portion of the ticket is disposed in the printing zone (formed by the alined portions of the type disk members 62, 63 and 64 and the cooperating reciprocable platen member) to the final position wherein the "final" portion of the ticket is disposed in the printing zone, includes the cam carrier member or cam bar 104. The cam bar 104 also predeterminedly causes reciprocation of the platen member for causing printing of the initial and final quantities in the "initial" and "final" portions of the ticket and also the reciprocable severing blade which cooperates with the stationary cutter blade 97.

As shown particularly in Figure 5, the cam bar 104 which is suitably guided for vertical reciprocating movement in the casing 24 has an upper loop portion which is offset (to the right in Fig. 5) from the lower portion thereof, which lower portion, at its lower end, has thereon a pintle member 105 to which is pivotally secured the outer end of the lever 106 which has its other or inner end rigidly secured to the rock shaft 107.

The rock shaft is pivotally supported at one end by suitable bearing means formed in the inner wall of the casing 24 and at the other end by bracket means 108 secured to the lower side of the indicator casing 21 (Fig. 5). At the end of the rock shaft 107, opposite that to which the lever 106 is secured, is rigidly secured the arm 109 which has a hook portion at its outer end disposed in the inner forked extremity 14 of the pump hook lever 9.

In Figure 5, the parts are shown in the position taken when the hose nozzle is supported by the outer end 10 of the pump hook lever 9. The corresponding position of the pump hook lever 9 is indicated in full lines in that figure. When the outer end of the pump hook lever 9 is swung upwardly, as above described, to initiate operation of the pump, the pump hook lever will take the dash line position shown in Figure 5, whereby the arm 109 and lever 106 will be swung rearwardly, as seen in Figure 5, or in clockwise direction as seen in Figure 7, to cause the cam bar 104 to be moved downwardly. Naturally, when the hose nozzle is replaced on the outer end 10 of the pump hook lever 9, the pump hook lever 9 will be swung from the dash line position of Figure 5 to the full line position therein, whereby the cam bar 104 will be reciprocated upwardly to the original position, as shown in Figures 5 and 7.

The means for causing the above-described feeding of the ticket so that the "final" portion of the ticket will be disposed in the printing zone at the end of the dispensing operation comprises the block 110 which is rigidly secured to the upper end of the loop portion of the cam bar 104 on the outside, and to which is pivotally secured a finger member 111 which is spaced from the block 110 by means of the spacer 112. Swinging movement of the finger member 111 in counterclockwise direction, as seen in Figures 7, 8 and 9, is limited by the pin 113 which extends outwardly from the block 110 for that purpose. The finger member 111 is aligned with the above described finger member 73 in such manner as to engage the finger 73 to cause counterclockwise rotation of the shaft 70, as seen in Figures 7, 8 and 9, upon upward reciprocation of the cam bar 104, caused by return of the hose nozzle to the outer end 10 of the pump hook lever 9, as above described.

This counterclockwise movement of the shaft 70 will cause movement of the printing roll 66, free of the shaft 65, from the position shown in Figure 10 to that shown in Figure 9. In the latter figure, the cooperation of the finger members 111 and 73 is shown. As is shown in Figure 10, when this movement occurs, the shaft 65 is held against rotation by engagement of the roller member 76 of the cam follower 75 with the circular peripheral surface of the cam 80. The pin 68 thus cooperates with the arcuate recess in the printing roll 66 to limit the relative rotary movement between the printing roll 66 and the supporting shaft 65. The linear advance of the ticket between rolls 66 and 71 is thus predeterminedly limited in such manner that upon the above cooperative engagement of finger members 73 and 111, the ticket will be fed an exact predetermined distance equal to the distance between the figures representing the "initial" and "final" quantities, as shown on the ticket in Figure 40.

Due to the fact that the finger member 111 may freely rotate in clockwise direction, as seen in Figures 7, 8 and 9, upon downward movement of the cam bar 104, it will pass the finger member 73 without, in any way, affecting the position of the finger member 73 or the rolls 66 and 71.

The platen means for cooperation with the type disk members 62, 63 and 64 comprises an elongated platen bar 114 having, at one end, a head 115 which is grooved for receiving the platen facing member 116. The platen facing member may be formed of any suitable material, either resilient or non-resilient, but is preferably formed of a material similar to that from which the roll 71 is formed and having like resiliency. The platen bar 114 is supported for reciprocation toward and from the type disk members 62, 63 and 64, and, at the end opposite the head 115, is provided with a bifurcated or forked portion 117 which straddles the reset shaft 18, as shown particularly in Figures 7, 8 and 11. The under side of the platen bar 114, adjacent the head 115, is provided with a suitable slot which receives the upper end of a leaf spring member 118 which has the lower end thereof rigidly secured in a block 119 which is rigid with the casing 24.

As above described, and as shown in Figure 7, the paper web 90 and carbon web 83 pass between the platen facing member 116 and the aligned portions of the rotary type disk members 62, 63 and 64. The figures on the members 62, 63 and 64 which are in alignment with the member 116 always correspond with the figures displayed by the indicator means, because of the above described connection through sleeves 58, 59 and 60 of the respective type disk members with their corresponding indicator drums.

Thus, when the indicator drums indicate the quantity zero, the corresponding numerals of the type disk members 62, 63 and 64 will be disposed in alignment with the member 116. This, of course, occurs when operation of the pump is begun by swinging the outer end of the pump hook lever 9 upwardly to draw the cam bar 104 downwardly, as above described. At this time, the downward movement of the cam bar 104 causes the platen bar 114 to be moved away from the type disk members or to the right, as seen in Figures 7, 8 and 11, and then released for travel toward the type disk members under the influence of spring 118.

The means for causing the above-described retraction and release of the platen bar 114 for forward or advance movement by the spring member 118, upon downward movement of the cam bar 104 for printing the initial quantity on the ticket, comprises a cam member 120 on the cam bar 104 and cooperating finger means 121 on the platen bar 114. The cam bar 104 also carries a second cam member 122 which cooperates, upon the opposite or upward return movement of the cam bar 104, with finger means 123 on the platen bar 114. The inner vertical part of the loop portion of the cam 104 is designated 104a (Figs. 5, 8 and 11), while the outer part thereof is designated 104b. The cam members 120 and 122 are secured to the oppositely facing inner sides of the loop portion with the cam member 120 secured to the part 104a and the cam member 122 secured to the part 104b thereof.

The finger members 121 and 123 are pivotally secured to the platen bar 114 by means of the pintle member 124. Each end of the forked portion 117 of the platen bar 114 has a pin 125 extending outwardly therefrom and the upper pin 125 has one end of a tension spring 126 secured thereto, while the opposite end of this spring 126 is secured to a pin 127 which is similar to the pins 125 and similarly disposed with respect to one end of the finger member 121. The lower pin 125 has one end of the tension spring 128 secured thereto. The opposite end of the spring 128 is secured to a pin 129, similar to the pin 127, and secured to the end of the finger member 123 in the same manner in which the pin 127 is secured to the finger member 121.

As shown in Figures 8 and 11, the springs 126 and 128 normally urge the rear ends of the finger members 121 and 123 inwardly to the reset shaft 18 which limits inward movement thereof. The finger member 121 has at its opposite end a rearwardly and upwardly inclined surface 121a which is adapted, upon downward movement of the cam bar 104, to be engaged by a similarly inclined surface 120a on the cam member 120. This tends to swing the finger member 121 in counterclockwise direction, but as this swinging movement is prevented by abutment of the rear end of the finger member 121 with the reset shaft 18, the platen bar 114 is moved rearwardly or away from the type disks until the cam member 120 has passed the surface 121a, at which time the platen bar 114 will be released for forward movement under the control of the spring member 18. At this time, the "initial" portion of the ticket will be disposed in the printing zone, if the indicator mechanism has been reset to zero. The quantity zero will be printed at that portion of the ticket.

After this downward movement of the cam bar 104, the dispensing operation is accomplished before upward movement of the cam bar 104 occurs due to depression of the outer end 10 of the pump hook lever 9 by placing the hose nozzle thereon. The cam member 122, which is secured to the part 104b of the cam bar 104, is provided with a forwardly and upwardly inclined surface 122a which is adapted, upon upward movement of the cam bar 104 to engage the similarly disposed inclined end surface 123a on the finger member 123 (Fig. 11).

This engagement of the surfaces 122a and 123a tends to swing the finger member 123 in clockwise direction, as seen in Figures 8 and 11, but engagement of the rear end of the finger member 123 with the reset shaft 18 prevents this movement, whereby the cam bar 114 is thrust rearwardly or away from the type disk members until the cam member 122 passes the finger member 123, whereupon the platen bar 114 will be released for forward printing movement under the force of the spring member 118. This printing action, of course, takes place subsequent to completion of the dispensing operation and subsequent to the advance of the ticket by engagement of finger members 111 and 73, as above described, to advance the ticket in such manner that the final portion thereof will be disposed in the printing zone when this printing action occurs. Necessarily, the quantity printed in the "final" space of the ticket will, of course, correspond with the final reading of the indicator mechanism.

Thus, as described above, downward movement of the cam bar 104, when the initial portion of the ticket is disposed in the printing zone, causes retraction and release of the platen bar 114 for printing the initial quantity in the appropriate portion of the ticket. Subsequent upward or return movement of the cam bar 104, after the ticket has been so fed that the final portion is disposed in the printing zone, causes retraction and release of the platen bar 114 for printing the final quantity at the appropriate point on the ticket.

Means is provided for predeterminedly severing each printed ticket from the strip or web 90, which means includes, as above described, the stationary cutter blade or severing blade 97. Cooperating with this stationary cutter blade 97 is a reciprocable cutter blade 130 which is secured by screw means 131 to a step provided at the forward end of the head 133 of the reciprocable cutter bar 132. Suitable guide means is provided for guiding the head portion 133 of the cutter bar 132 in its reciprocation, and the opposite or rear end of the cutter bar 132 has a forked or bifurcated portion 134 which straddles the cutter operating shaft 135 in the same manner in which the bifurcated or forked portion 117 of the platen bar 114 straddles the reset shaft 18. This cutter operating shaft 135 is suitably journaled in the casing 24 with one end thereof supported by a boss provided on the wall 26, and pinned to the shaft 135 for rotation therewith is a gear 136 which meshes with the reset gear 82. Also pinned to the cutter operating shaft 135, adjacent the forked or bifurcated end portion 134 of the cutter bar 132, is a cam member 137 which is adapted to cooperate with a cam follower roller 138 which is journaled on the pin 139. The pin 139 is rigidly secured to one side of the cutter bar 132.

It will thus be seen that rotation of the cutter operating shaft 135, in synchronism with the reset shaft 18, will cause reciprocation of the cutter bar 132 in such manner that the reciprocable cutter blade 130 will cooperate with the stationary cutter blade 97, at a predetermined point in the operative cycle of the mechanism to cut or sever from the paper strip or web 90 a ticket of predetermined length, which is disposed below the cutter blades 97 and 130, and between plate members 101 and 102 with an end thereof extending outwardly, for accessibility, into ticket receptacle 103. The tension spring 140 is secured to the forked or bifurcated end portion 134 of the cutter bar 132, and also to suitable stationary bracket means to constantly resiliently urge the cutter bar 132 rearwardly in order that the roller 138 may constantly ride against the cooperating surface of the cam member 137.

Thus, the cutter bar 132 is advanced only at a predetermined point in the operative cycle, after the reset shaft 18 has been rotated, in resetting. This takes place after the paper web 90 has been predeterminedly fed or advanced so that the end portion thereof, which has been printed with an impression from the roll 66, as well as the initial and final quantities, extends below the cooperating cutter blades 97 and 130 of this ticket severing means. The severed ticket will, of course, be disposed between the parallel portions of the plate members 101 and 102, with its outer edge extending outwardly into the ticket receptacle 103 for ease of removal of the severed ticket from the pump.

The resetting apparatus which provides connection between the reset shaft 18 and the indicator drums is actuated through the shaft 141 which is rotatably supported by the walls 23 and 23a of the casing 22. This shaft 141 extends rightwardly (Figs. 6 and 14) to a point adjacent the wall 26 of the casing 24, where it passes through a boss 142 on the wall 23. Pinned to the shaft 141, adjacent the boss 142, is the cylindrical spacer flange 144 of the arm 143 (Fig. 14).

Freely swingable on the shaft 141, adjacent the arm 143 which is fixed thereto, is the substantially triangular plate member 145 having a stop 146 thereon, which is adapted, when the plate member 145 is swingably moved, to engage the arm 143 and swing it, and its rigidly attached shaft 141, in one direction. Rigidly fixed to the side of the plate member 145 is a connector member 147 which is substantially cylindrical and provided at its outer side with a transverse, or radial groove 148 into which extends the tongue 149 of the coupling member 150 having pinned thereto the shaft 151 which extends through a boss 152 in the wall 26 and has pinned thereto the cylindrical boss 153 which is rigid on the link member 154 (Figs. 5, 38 and 39).

Pivotally secured to the outer end of the link 154 is one end of the link 155 which has its opposite end pivotally secured at 156 to the vertically reciprocable cam bar 104. As shown in Figures 38 and 39, vertical reciprocation of the cam bar 104 will be translated, through links 154 and 155, to oscillation of the shaft 151 and the substantially triangular plate 145. When the direction of this oscillation is counterclockwise, as shown in Figures 15 and 16, the stop 146 engages the lower side of the right end of the arm 143 and urges it upward, as seen by comparison of Figures 15 and 16, in such manner as to rock the shaft 141 in counterclockwise direction, which shaft is rigid with the arm 143. Counterclockwise movement of the arm 143 is limited, as shown in Figure 16, by the reset shaft 18.

Pinned to the shaft 141, adjacent each indicator drum, is a stop arm 157. These stop arms 157 are all identical and are similarly disposed with respect, each to its adjacent drum, as shown in Figure 6. The stop arms are each adapted, when the pump is inoperative and the cam bar 104 is in uppermost position, as shown in Figure 5, to have their extreme ends disposed directly in the path of abutments 158 which extend axially outwardly from the peripheral flanges on the respective indicator drums.

As may be readily seen from Figure 6, the forward indicator drums 32, 33 and 34 only are provided with abutments 158 for cooperation with the adjacent stop arms 157 on the shaft 141 which is properly disposed in the casing 22 to provide the desired location of the stop arms 157 for cooperation with the abutments 158. Pinned to the reset shaft 18 is a reset gear 159 which meshes with a gear 160, which is pinned to the above-described shaft 30 which is supported for free rotation in the walls 23 and 23a for providing support for the rearmost indicator drums 32, 33 and 34 (Figs. 6 and 12). The reset gear 159 has rigidly secured thereto, the first stop 161 which is disposed substantially closely with respect to the reset shaft 18 and the second stop 162 which is disposed a greater distance from the shaft 18 and which is sufficiently arcuately spaced from the first stop 161 to permit engagement of the first stop 161 with the upper surface of the arm 143 to be followed by engagement of the second stop 162 therewith. The engagement of the first stop 161 with the arm 143 moves it downwardly to the position illustrated in Figure 17, while the engagement of the second stop 162 therewith moves it from the position illustrated in Figure 17 to that illustrated in Figure 18.

When the lever 143 is in the position illustrated in Figure 18, each stop arm 157 is disposed directly in the path of the cooperating abutment 158 on the corresponding indicator drum, as shown in Figures 15 and 18. During each resetting operation, the reset shaft 18 and its rigidly attached reset gear 159 travels through one full revolution only in clockwise direction, as seen in Figures 15 to 18 inclusive. The gear 160 likewise rotates one full revolution only, but in counterclockwise direction.

The rear indicator drums 32, 33 and 34 are similarly mounted with respect to the shaft 30, but transfer gearing is provided between the rear indicator drum 32 and the rear indicator drum 33, and between the rear indicator drum 33 and the rear indicator drum 34. The indicator drums each have substantially cup-shaped shells with the flanges thereof directed toward the left, as seen in Figure 6.

The gear 160 thus rotates with the shaft 30 in counterclockwise direction, as seen in Figures 15 to 18 and 27 to 29, for one full revolution during a resetting operation. Each indicator drum 32 is provided at its closed side with a rigidly attached gear 163, while each indicator drum 33 is provided with a similar and similarly attached gear 164. Each of the indicator drums 34 is provided at its closed side with a rigidly attached gear 165. These gears cooperate with means, hereinafter described, for synchronously driving the forward indicator drum 32 from the rear indicator drum 32, the forward indicato drum 33 from the rear indicator drum 33, and the forward indicator drum 34 from the rear indicator drum 34 (Fig. 6).

Freely rotatable on the shaft 30 between the indicator drums 32 and 33 is a gear 166. A similar gear 166 is freely rotatable on the shaft 30 between the rear indicator drums 33 and 34 respectively. Rigidly attached to each gear 166 is a ratchet member 167 which has the teeth thereof inclined in counterclockwise direction, as seen in Figures 35, 36 and 37. Adapted to engage the teeth of each ratchet member 167 is a stop 168 which is rigidly secured to an intermediate portion of a bent arm member 169. Each bent arm member 169 is pivotally attached at one end to the shell of the corresponding indicator drum, as 33, in Figures 34 to 37, by means of an integral boss 170 and cooperating pintle screw 171 (see Fig. 34).

Separated from the bent arm 169 by the washer 172 and the boss 170 is a pawl member 173 which is pivoted at one end on the pintle screw 171. This pawl member 173 has a sharp corner at its outer end which is disposed in a notch 33b of the central hub 33a of the drum 33, as seen in Figure 34, and this disposition of the sharp corner of the pawl 173 is maintained by means of the spring 174 which is supported on a screw 176 which is screw-threadedly secured in a boss 175 which is integral with the circular side wall of the drum 33, as shown in Figure 34.

The inner end of the spring 174 extends to a suitable aperture provided in the pawl 173, while the outer end thereof engages the inner circular wall of the drum 33. The spring 174, therefore, constantly resiliently urges the pawl 173 in clockwise direction about the axis of its pivotal support on the pintle screw 171. Engagement of the stop 168 of the bent lever 169 with the teeth of the ratchet 167 is maintained by the tension spring 177 which has one end secured to the free end of the bent lever 169, while the other end thereof is secured to a pin 178 which is rigid with the side wall of the drum 33. The bent lever 169 is thus constantly resiliently urged in counterclockwise direction, as seen in Figures 35, 36 and 37. The shaft 30 is provided with an axial notch 180 so inclined that engagement therewith of the sharp corner of the pawl 173 will permit the drums 33 to rotate freely in counterclockwise direction with respect to the shafts 30, as seen in Figures 35 to 37 inclusive, while preventing rotation of the drums 33 in clockwise direction with respect to the shaft 30, as seen in Figures 35 to 37.

As will be seen from Figures 15 to 18 inclusive and Figures 35 to 37 inclusive, clockwise rotation of the reset shaft 18, during resetting, will cause counterclockwise rotation of the gear 160 which is rigid with the shaft 30. Therefore, the shaft 30, during resetting, will be rotated in counterclockwise direction, as seen in Figures 35 to 37 inclusive, whereby the notch 180 will engage the sharp corner of the pawl 173 and the counterclockwise rotation of the shaft 30 will be transmitted through the pawl 173 and boss 170 to counterclockwise rotation of the drum 33.

At this time, the gears 166 and their rigidly connected ratchets 167 would remain stationary and the stops 168 on the bent levers 169 will ride over the teeth of the ratchets. Each of the rear drums 32, 33 and 34 are provided with a pawl 173, with spring means 174, with notches 33b in the hub 33a thereof and the notch 180 provided in the shaft 30 cooperates with each of these pawls 173. Due to the fact, however, that the rear drum 32 is a primary unit in the drive between the rear drums 32, 33 and 34, it is provided with neither a bent lever 169, spring 177 or stop 168. On the contrary, the gear 182 is rigidly secured thereto by means of studs 181. This attachment of the gear 182 directly to and rigidly with the rear drum 32 provides a rigid connection between the gear 182 and the gear 163 on the rear drum 32.

The gear 182 meshes with the gear 48, as shown in Figure 6, and the drive of the rear drum 32 is thus transmitted from the gear 48 through gear 182 to the rear drum 32 and its rigidly attached gear 163. As shown particularly in Figures 6 and 34, the gear 163 has rigidly attached thereto the transfer disk 183, while the gear 164 which is rigid with the rear drum 33, has rigidly attached thereto the transfer disk 184. The transfer disk 183 has rigidly secured thereto the transfer tooth member 185, while a similar transfer tooth member 186 is rigidly attached in similar manner to the transfer disk 184 (see Figs. 13 and 34). The transfer disks 183 and 184 are spaced from the adjacent gears 186 by means of spacer members 187 of cylindrical form, which are freely rotatable on the shaft 30 (Fig. 34).

In order to establish drive connection between the transfer disk 183 and the adjacent gear 166 which carries the ratchet 167 cooperating with the drum 33 and between the transfer disk 184 and its corresponding gear 166, the shaft 188 extends from the wall 23 to the wall 23a in parallelism with the shaft 30 and carries the transfer gears 189 which are freely rotatable thereon.

Figure 13:
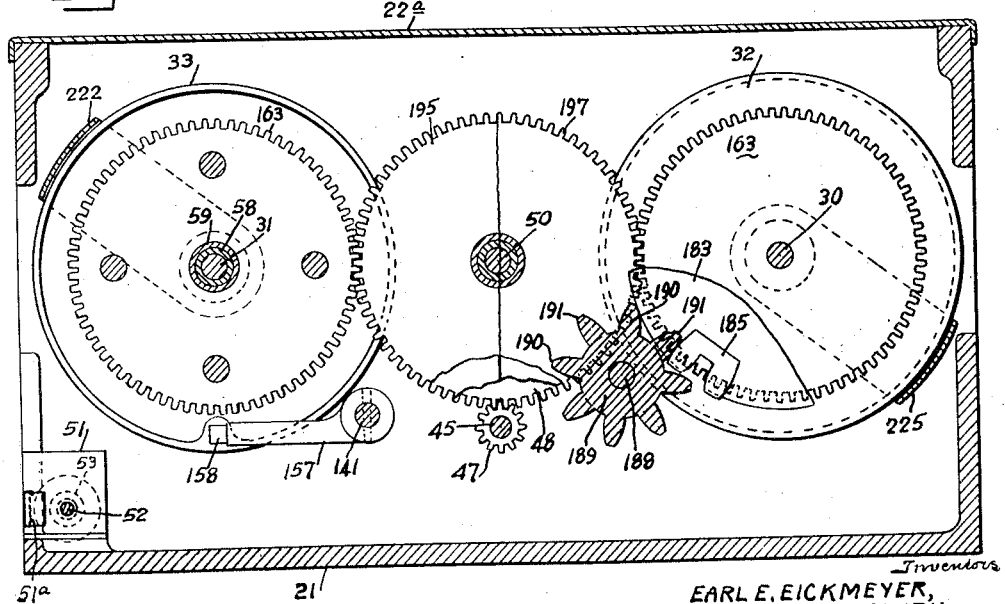
Figure 13 is a section taken substantially on the line 13—13 of Figure 6.

Each transfer gear 189 has alternate teeth 190 which extend from side to side thereof and which may be thus termed wide teeth and alternate narrow teeth 191. Both the teeth 190 and the teeth 191 mesh with the transfer teeth 185 once during each revolution of the transfer disk and its attached gear 163 or 164. The space between the adjacent teeth of the transfer tooth members 185 on the disk 183 is cut away, as shown in Figure 13, and the same is true of the space between the teeth on the transfer tooth member 186 of the transfer disk 184. The narrow teeth 191 of the transfer gears 189 do not extend into the plane of the adjacent transfer disk, but may pass freely past these disks during rotation, while the wide teeth 190 extend past the plane of the transfer disks in such manner as to ride upon the periphery thereof until they are reached by the cut-away space between the teeth of the transfer tooth member during rotation of the transfer disk.

Thus, for each full revolution of the transfer disk 183 and its rigidly attached gear 163, which is rigid with the drum 32 and the gear 182, the transfer gear 189 is advanced two teeth only. The abutment of the wide teeth with the peripheral edge of the transfer disk prevents overriding of the transfer gear 189. The adjacent gear 166 is likewise advanced two teeth and, therefore, ten revolutions of the drum 32 must occur to cause one complete revolution of the drum 33, while ten complete revolutions of the drum 33 must occur to cause one complete revolution of the drum 34.

This must naturally occur, because the gear 182 is driven in counterclockwise direction, as seen in Figures 35, 36 and 37, as is also the transfer disk 183, the transfer disk 184 and the adjacent gears 166. The gears 166 have the ratchets 167 rigidly secured thereto and, therefore, the ratchet, when the drums are driven by the gear 48 through the gear 182, etc. by operation of the pump meter, must revolve in counterclockwise direction, as seen in Figures 35, 36 and 37. When this counterclockwise rotation of the ratchets 167 occurs, as may be clearly seen from Figures 35, 36 and 37, the stop 168 is engaged by a tooth of the ratchet 167 which, due to the tooth inclination, may not pass the stop 168 and the rotation of the ratchets 167 is thus transmitted through the bent levers 169 and bosses 170 to the respective drums 33 and 34.

As will be clearly seen from Figure 6, we have totally obviated the necessity for duplication of transfer gearing, or the necessity for the use of separate transfer gearing between the drums of each bank of indicator drums.

According to the principles of this invention, it is merely necessary to utilize transfer gearing between the drum 32 and the drum 33 and between the drum 33 and the drum 34 in the rear of indicator drums and in the rear bank only thereof. According to the construction illustrated, we have obviated the necessity for use of additional transfer gearing by provision of means whereby the drum 32 of the front bank is driven positively from the drum 32 of the rear bank, and whereby the corresponding drum 33 of the front bank is driven positively from the drum 33 of the rear bank, and whereby the drum 34 of the front bank is driven positively from the drum 34 of the rear bank.

The means for providing positive drive connection between the corresponding drums 34 comprises a sleeve 192 having rigidly secured to opposite ends thereof identical gears 193, one of which meshes with the gear 165 rigid on the drum 34 of the rear bank, and the other of which meshes with the gear 165 rigid with the drum 34 on the front bank of indicator drums. The sleeve 192 is freely rotatable on the above-described shaft 50.

Superposed on and freely rotatable on the sleeve 192 is a sleeve 194 which has rigidly attached to each end thereof a gear 195. One gear 195 meshes with the gear 163 fixed to the drum 32 of the rear bank, while the gear 195 meshes with the gear 163 fixed to the drum 32 of the front bank. Advancement of one of the drums 32 is, therefore, accompanied by similar advancement of the other drum 32. Supported for free rotation on the sleeve 194 is a third sleeve 196 which has a gear 197 rigidly attached to each end thereof. One gear 197 meshes with the gear 164 which is rigid with the drum 33 of the rear bank, while the other gear 197 meshes with the gear 164 which is rigid with the drum 33 of the forward bank. Therefore, the drum 32 of the forward bank is positively driven from and maintained in synchronism with the drum 32 of the rear bank.

Likewise, the drum 33 of the forward bank is positively driven from and maintained in synchronism with the drum 33 of the rear bank and the drum 34 of the forward bank is positively driven from and maintained in synchronism with the drum 34 of the rear bank. These drums are all driven by the shaft 36 of the meter 35 from the shaft 40 through bevel gears 41 and 42, shaft 43, clutch mechanism 44, shaft 45, pinion 47 and gear 48. The gear 48 drives the gear 182 which is rigid with the drum 32 of the rear bank and its attached gear 163, and the gear 163 through the lefthand gear 195 (Fig. 6), sleeve 194, and the righthand gear 195 drives gear 163 and the rigidly secured drum 32 of the forward bank.

The drive of the drum 33 of the rear bank is accomplished through the transfer disk 183, transfer tooth mechanism 185 and lefthand transfer tooth mechanism 185 and lefthand transfer gear 189 to the gear 166 and to ratchet 167 and from the drum 33 of the rear bank, the drive continues through the righthand gear 197, the sleeve 196, the lefthand gear 197 and the gear 164 to the rigidly attached drum 33 of the forward bank. The drive from the drum 33 of the rear bank continues through the transfer disk 184 and associated transfer gearing to the drum 34 of the rear bank and thence through the rigidly attached gear 165, the meshing righthand gear 193, the sleeve 192 and lefthand gear 193 to the gear 165 and rigidly attached drum 34 of the forward bank.

Shutter means is provided for obscuring the indicator means of the pump, at certain times, to prevent fraudulent operation thereof. This means becomes operative when, after a fuel dispensing operation, attempt is made to perform a second dispensing operation without resetting the indicator means to zero. This makes obligatory the performance of the resetting operation subsequent to each dispensing operation in order that the indicator means shall, thereafter, be visible. The closed position of the shutter means provides warning of this failure to reset the indicator means and prevents guidance of the operator, by the indicator means, in the performance of a further dispensing operation without properly resetting the indicator means to zero reading in order that it may register the exact quantity delivered.

The substantially triangular plate member 145 and its connection with the shaft 141 is described above. As also described above, when the outer end 10 of the pump hook lever 9 is swung upwardly, the substantially triangular plate member 145 is likewise swung upwardly. This upward movement of the triangular plate member 145, when the outer end of the pump hook lever 9 is raised to initiate operation of the pump, is utilized in the following manner for controlling the shutter means of the pump, as described above.

The shutter control means is best illustrated in Figures 12, 14 and 19 to 33 inclusive. Secured to the lower corner portion of the plate member 145 by means of the nut 199 is a stud member 198, which has pivotally secured thereto the slide member 200. This slide member 200 is provided at its upper end with a longitudinal slot 201 which extends over the above-described shaft 43. Pivotally secured to the slide member 200 by means of the shoulder rivet 202 is a cam plate 203 which is biased in counterclockwise direction (Fig. 30) by the spring member 204 which has its lower end in engagement with a side of the cam plate 203 and its upper end secured on a pin 205. The cam plate 203 has an angular notch 206 at its right side, as seen in Figures 19 to 23 and 30 to 33 inclusive, which divides the cam plate 203 into two substantially triangular portions. The lower portion has its lower edge in engagement with the head of a screw 207, by means of which the slide member 200 is pivotally secured to the stud 198.

This engagement limits counterclockwise movement of the cam plate 203 under the influence of spring 204. The upper end of this cam plate 203 is adapted for engagement with a pin 208 secured to the upper corner of the end portion of a front pawl member 209 which is pivotally supported on the above-described shaft 43 and urged in counterclockwise direction thereon by means of a spring 210. At its upper end, the pawl 209 is provided with an arcuate portion 211 which is adapted for engagement with a front cam member 212 rigidly secured to the reset shaft 18 and which is provided with a peripheral notch 213 which receives the arcuate head portion 211 of the pawl 209 in the "at rest" position thereof. The front cam member 212 is rigidly secured to the reset shaft 18 by means of the pin member 214 (Fig. 14). The front cam member 212 has a rearwardly extending central hub which is suitably bored for receiving and pivotally supporting the forward end of the shaft 50, as shown in Figure 14.

The shaft 43 also pivotally supports a back pawl member 216 which is of substantially the same shape as the front pawl member 209, but which has the lower end thereof extending beyond the corresponding end of the front pawl member 209. A spring 217 corresponding to the spring 210 biases the front pawl member 216 in counterclockwise direction about the shaft 43, as seen in Figures 24 to 28. At its upper end, the back pawl 216 is provided with a transverse cylindrical head member 218 which is adapted to cooperate with the back cam member 220 which has therein a peripheral notch 219 similar to the notch 213 of the front cam member 212.

As shown in Figure 14, the transverse head member 218 of the back pawl 216 extends forwardly sufficiently for engagement with the notch 213 in the front cam 212 as well as the notch 219 in the back cam member 220. The back cam member 220 is pinned by means of the pin 221 (Fig. 14) to the shaft 50 which, as above described, is driven through gearing from the shaft 36 of the meter 35 (Figs. 5 and 12).

The front shutter member comprises a substantially U-shaped plate member 222 which is pivotally supported at one end by the shaft 31 and at the other end by the outer sleeve 60, as shown in Figures 5, 12 and 13. At this latter end, the plate is provided with a substantially elongated downwardly extending arm 223 and a short upwardly extending arm 224. The rear shutter member 225 is likewise of U-shape, being provided with a substantially elongated downwardly extended arm 226 similar to the arm 223 of the front shutter member 222 and with a short upwardly extending arm 227 similar to the above described arm 224 of the front shutter member 222. The arms 224 and 227 are each pivotally secured to opposite ends of the shutter setting link 228, while the arms 223 and 226 are pivotally secured to opposite ends of the shutter latching bar 229 which has rigidly secured thereto the forward shutter latching bar member 230 which, as shown in Figure 14, is substantially parallel thereto.

As shown in Figure 12, the shutter member 222 is constantly urged downwardly by means of the tension spring 231 which is secured at one end thereto and at the other end to the casing. In the position shown in Figure 12, the shutter members 222 and 225 are withdrawn from obstructing position with respect to the indicator drums for full vision of the respective indicator drums. The parts are maintained in that position by cooperation of the lower ends of the front and back pawl members 209 and 216 with suitable notches provided in the members 229 and 230.

As shown particularly in Figures 19 to 23 inclusive, the forward latching bar member 230 is provided with a notch 232 which has its right end inclined upwardly and its left end terminating in a vertical wall. This notch 232 cooperates with a front pawl member 209 in such manner that, when the lower end of the pawl member 209 is disposed in the notch 232, abutment of the lower end of the pawl 209 with the left end of the notch 232 will prevent further rightward movement of the forward latching bar member 230. The force of the spring 231 is always transmitted to the forward latching bar member 230 in such manner as to constantly urge it to the right. Thus, when the front pawl member 209 has its lower end disposed in the notch 232, it prevents the spring 231 from thrusting the member 230 to the right after engagement of the pawl 209 with the left end of the notch 232.

The shutter latching bar 229, as shown in Figures 24 to 28 inclusive, is provided with a similar notch 233 which has its left end in alignment with the left end of the notch 232. When the lower end of the back pawl member 216 is disposed in the notch 233, as shown in Figure 24, further leftward movement of the member 229, under the influence of spring 231, is prevented. As pointed out above, the members 230 and 229 are rigidly secured together.

Means responsive to the resetting operation for opening the shutter members 222 and 225, after they have been closed, comprises the angle 234 which is rigidly secured to the shutter setting link 228 and which cooperates with a setting pin 235 rigidly fixed to the front cam member 212, as shown in Figures 19 to 23 inclusive.

Clockwise rotation of the back cam member 220 is caused, during fuel delivery, through rotation of the shaft 50 which is driven from the meter 35, as above described. Clockwise rotation of the front cam member 212 is achieved, during resetting, by like manual rotation of the resetting shaft 18.

When the parts are in the position shown in Figure 12, full visibility of the drums 32, 33 and 34 of each bank is provided, the shutters being held open by engagement of the longer end of the back pawl member with the left end of the notch 233 in the shutter latching bar 229. When the hose hook is manually thrust upwardly, as above described, the plate member 145 will be swung upwardly from the position shown in Figure 12 to that shown in Figure 19.

During the upward movement of the plate member 145, the upper triangular end of the cam plate 203 will abut with the pin 208 which is rigid with the end of the front pawl 209, whereby the lower end of the pawl 209 will first be drawn upwardly and then again released after passage of the upper end of the cam plate 203 past the pin 208, whereby the lower end of the pawl 209 will be disposed in the notch 232. Although the lower end of the pawl 209 is disposed in the notch 232, it does not abut the left end of the notch because of the engagement, as shown in Figure 24, of the lower end of the back pawl 216 with the left end of the notch 233.

The parts will then take the position shown in Figures 19 and 24 and, during delivery by the pump, the shaft 50 and its rigidly attached back cam member 220 will be rotated in clockwise direction, as shown by comparison of Figures 24 and 25. This causes the notch 219 to pass the head 218 of the back pawl member 216 to swing the member 218 outwardly with respect to the cam and to raise the lower end of the pawl 216 out of the notch 233. The position of the pawl 216 with respect to the notch 233 is shown in Figure 25, and, as shown in Figure 20, at that time, the lower end of the front pawl member 209 will be engaging the left end of the notch 232. Thus, the shutters will be held open by the front pawl member 209.

The rotation of the shaft 50 and cam 220 continues during delivery by the pump without in any wise affecting the position of the shutter mechanism and upon completion of the dispensing operation, the hose hook is moved downwardly by placing the hose nozzle thereon, whereby to swing the plate member 145 downwardly to the position shown in Figure 21. This downward movement of the plate member 145 will cause the cam plate member 203 to swing in clockwise direction against the spring 204 in the direction indicated by the arrows in Figure 31 so that the upper end of the cam plate 203 may move down under the pin 208, as shown in Figure 30. The parts are then in the position shown in Figures 21 and 26, and the shutters are still held open by engagement of the lower end of the front pawl 209 in the notch 232. Thereafter, if the resetting operation is carried out, rotation of the resetting shaft 18 in clockwise direction will cause like rotation of the front cam member 212 to move the upper end 211 of the front pawl member 209 out of the peripheral notch 213 of the front cam member 212.

As shown in Figure 22, the lower end of the front pawl member 209 will be moved upwardly out of the notch 232, whereby the spring 231 is permitted to cause the latching bar members 229 and 230 to be thrust to the left to cause the shutters to be closed. This closing of the shutters is continued until, closely adjacent the end of the full revolution of rotation of the front cam member 212, during resetting, the setting pin 235 engages the angle 234 to thrust the shutter setting link 238 to the right against the force of the spring 231 to open the shutters, just prior to, and substantially simultaneously with, completion of the resetting operation.

At this time, the notch 213 in the front cam member 212 will be so disposed with respect to the front end 211 of the front pawl 209 as to permit the lower end of the pawl 209 to fall into the notch 232, whereby to latch the shutters open. This completes a cycle of operation when the resetting operation is properly accomplished by the operator to return the indicator drums of the pump to a proper zero reading and thus prepare the pump mechanism for a further dispensing operation.

In the event that the resetting operation is not carried out by the operator subsequent to placing the nozzle on the hose hook to move the plate member 145 downwardly and place the parts in the position illustrated in Figures 21 and 26, the shutters will remain closed because the setting pin 235 is rigid with the front cam member 212 which is fixed to the resetting shaft 18 and engagement of the resetting pin 235 with the angle member 234 may be accomplished only by rotation of the front cam member 212 during resetting. In that case, the parts will remain in the position shown in Figure 21 with the front pawl member 209 latchingly holding the latching bar members 229 and 230 against rightward movement with the shutters open, until the hose hook is moved upwardly to swing the plate member 145 upwardly.

As above described, the upper end of the cam plate 203 is disposed, as shown in Figure 30, below the pin 208, and the simultaneous upward movement of the plate member 145 and the hose hook will cause the cam plate 203 to swing the lower end of the front pawl 209 upwardly out of the notch 232 to release the latching bar members 229 and 230 and permit the shutters to close. In this case, the second fuel dispensing operation, which is attempted to be accomplished without resetting, will be a blind fuel dispensing operation, because the shutters will be closed and the operator may not observe the indicating mechanism of the pump.

It will thus be seen that the shutter mechanism is so arranged that the shutters will be closed subsequent to completion of a fuel dispensing operation, through manual movement of the hose hook upwardly, and consequent upward swinging movement of the plate member 145, where resetting has not been accomplished. This prevents fraud on the part of the pump operator because, in attempting such a second dispensing operation without resetting the indicator mechanism, he is unable to observe the indicator mechanism and must thus work blindly. Otherwise, the shutter mechanism is closed during the resetting operation, as shown in Figures 22 and 27, until, immediately subsequent to completion of the resetting operation, the resetting pin 235 engages the angle member 234 to open the shutters and permit the pawl members to co-operate with the latching bar members 229 and 230 to latch the shutter mechanism open preparatory to a further operation of the pump.

If, after completion of a dispensing operation, resetting is not accomplished, then immediately upon removal of the hose nozzle from the hose hook and the manually accomplished upward movement of the hose hook, the shutters are automatically closed in such manner as to prevent observation of the indicator mechanism until the shutters are re-opened through the proper accomplishment of the resetting operation, as above described.

It will thus be seen that the mechanism is so arranged that, when the resetting operation has been properly accomplished, the shutters are opened to provide full vision of the pump indicator mechanism whereupon removal of the hose nozzle from the hose hook 10 and manual upward movement of the hose hook 10 causes downward movement of the cam bar 104 to accomplish the proper printing in the initial space of a ticket (Fig. 40) of the proper zero reading of the pump indicator mechanism.

As above described, the other matter printed on the ticket from the type on the type roll 66 will have been printed on the ticket during the previous resetting operation. During the dispensing operation, the shaft 40 will rotate with the shaft 36 of the meter 35 to drive the indicator mechanism for properly recording the amount of fuel dispensed, while at the same time the type disk members 62, 63 and 64 are revolved in synchronism with their corresponding indicator drums until completion of the dispensing operation. During this time, the shutter mechanism will remain open because of the engagement of the lower end of pawl 209 in the notch 232, as above described. Rotation of the back cam member 220 with the driven shaft 50 will not affect this open position of the shutters.

When the fuel dispensing operation is completed, the hose nozzle is placed upon the outer end 10 of the pump hook 9 to cause the cam bar 104 to be reciprocated upwardly, whereby the ticket will be first advanced, by the mechanism shown in Figure 9, until the final portion thereof is disposed in the printing zone and thereafter, the further upward movement of the cam bar 104 will cause the platen bar 114 to be thrust to the right, as seen in Figure 7, and released, whereby the spring 118 may thrust it to the left to print the final reading of the recording mechanism in the final space of the ticket. The ticket will then be printed and will remain in the pump.

If the proper resetting operation is started, the shutter mechanism will close to obscure the indicator mechanism while the rotation of the shaft 135, through the reset shaft 18, will cause the ticket to be severed from the end of the paper web 90 for release from the pump. At the end of the resetting operation, the reset pin 235 will cooperate with the angle 234 to re-open the shutters and cause them to be latched open preparatory to the beginning of the next cycle of operation of the pump.

As above described, the accomplishment of the resetting operation will cause simultaneous printing of the matter other than the initial and final quantities on that portion of the paper web 90 which will become the ticket delivered by the pump at the end of the next dispensing operation, provided the indicator mechanism is then properly reset.

If the above described dispensing operation is completed without resetting, then immediately upon resetting the hose hook to initiate a further dispensing operation of the pump, the shutters will be closed and will remain closed until the indicator mechanism has again been properly reset to zero reading. In the event that the resetting operation is not properly accomplished, the ticket will not be properly severed and delivered by the pump, but will remain therein, and the printing operations occurring upon the downward and upward movement of the cam bar 104 responsive to movement of the hose hook will take place when the final portion of the ticket is disposed in the printing zone of the printing mechanism, whereby, in the second dispensing operation, the final reading of the pump upon the completion of the previous dispensing operation will be printed over the previous printing of this quantity and the subsequent printing of the reading of the machine at the completion of the second dispensing operation will again occur, over this previously printed matter, in the final portion of the ticket, whereby to cause a mutilation of the printed final quantity on the ticket and readily warn the purchaser that the dispensing operation has been accomplished in improper, if not fraudulent manner.

It will be understood that the above described structure is merely illustrative of the manner in which the principles of our invention may be utilized and that we desire to comprehend within our invention such modifications as come within the scope of the claims and the invention.

Having thus fully described our invention, what we claim as new and desire to secure by Letters Patent is:

1. In a motor driven fluid dispensing pump having a drive motor, fluid delivery indicator means, and a hose supporting hook movable for starting and stopping said motor; printing type means synchronously driven by said indicator means, means to support and feed a printable member adjacent said printing type means, means including a platen member reciprocable for cooperation with said printing type means to print indicator readings on said printable member, and means for causing reciprocation of said platen member including a reciprocable cam bar operatively connected to said hose supporting hook and operated through movement thereof.

2. In a motor driven fluid dispensing pump having a drive motor, a fluid delivery meter, and a hose supporting hook movable for starting and stopping said motor; quantity printing type means driven in synchronism with said meter, means to support and feed a printable strip adjacent said quantity printing type means, means including a platen member reciprocable for cooperation with said quantity printing type means to print quantity records on said printable strip, and means for causing reciprocation of said platen member including a reciprocable cam bar and a linkage connecting said cam bar with said hose supporting hook for reciprocation thereby upon movement thereof in starting and stopping the pump for printing initial and final quantities on the strip.

3. In receipt ticket printing means for a motor driven fuel dispensing pump having meter driven indicator means, and a hose hook for controlling the pump motor; movable type plate means synchronously driven from said indicator means, means to support and feed a printable strip adjacent said type plate means, platen means reciprocable for cooperation with said type plate means for printing indicator readings on said strip, oppositely reciprocable cam bar means for causing reciprocation of said platen means in each direction of reciprocation thereof, and linkage means providing operative connection between said hose hook and said cam bar means for translating movement of said hose hook to start said pump motor into reciprocation of said cam bar means in one direction to cause reciprocation of said platen means for printing the initial indicator reading on said strip and for translating movement of said hose hook to stop said motor into oppositely directed reciprocation of said cam bar to cause reciprocation of said platen means for printing on said strip the final indicator reading.

4. In a fuel dispensing pump means having power operated pumping means and meter means, a fuel output indicator means driven from said meter means, type disk means synchronously driven from said indicator means, means for supporting and feeding a paper strip adjacent said type disk means, and means operative upon initiation and upon completion of a fuel delivery operation for cooperating with said type disk means to print the initial and final indicator readings on said paper strip, said next to last mentioned means including a hose hook and a cam bar actuated by said hose hook for operating said type disk means.

5. In receipt ticket printing means for a motor driven fuel dispensing pump having meter driven indicator means, and a hose hook for controlling the pump motor; movable type plate means synchronously driven from said indicator means, means to support and feed a printable strip adjacent said type plate means, platen means reciprocable for cooperation with said type plate means for printing indicator readings on said strip, oppositely reciprocable cam bar means for causing reciprocation of said platen means in each direction of reciprocation thereof, and linkage means providing operative connection between said hose hook and said cam bar means for translating movement of said hose hook to start said pump motor into reciprocation of said cam bar means in one direction to cause reciprocation of said platen means for printing the initial indicator reading on said strip and for translating movement of said hose hook to stop said motor into oppositely directed reciprocation of said cam bar to cause reciprocation of said platen means for printing on said strip the final indicator reading, resetting means, severing means operable only after the operation of said resetting means.

6. In a fuel pump including fuel dispensing means, quantity indicating means associated with said fuel dispensing means, resetting means for said indicating means, means for printing on a ticket the initial and the final readings of said quantity indicating means, means for severing said ticket from a ticket roll, and actuating means for simultaneously actuating said ticket printing means to print the final reading on said ticket and actuating said ticket severing means at the time said ticket is delivered.

7. In a fuel pump including fuel dispensing means, quantity indicating means associated with said fuel dispensing means, resetting means for said indicating means, means for printing on a ticket the initial and the final readings of said quantity indicating means, means for severing said ticket from a ticket roll, and actuating means for simultaneously actuating said ticket printing means to print the final reading on said ticket, said ticket severing means being actuated by said resetting means at the time said ticket is delivered.

EARL E. EICKMEYER.
ANTHONY G. HORVATH.